US011077978B2

(12) United States Patent
Hirono et al.

(10) Patent No.: US 11,077,978 B2
(45) Date of Patent: Aug. 3, 2021

(54) PRODUCT TRANSFER APPARATUS AND PRODUCT TRANSFER SYSTEM

(71) Applicant: AMADA CO., LTD., Kanagawa (JP)

(72) Inventors: Jun Hirono, Kanagawa (JP); Koji Tsuda, Kanagawa (JP); Hideto Fukushige, Kanagawa (JP); Kuniaki Abe, Kanagawa (JP); Ryoma Kitano, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 0 days.

(21) Appl. No.: 16/761,087

(22) PCT Filed: Nov. 8, 2018

(86) PCT No.: PCT/JP2018/041439
§ 371 (c)(1),
(2) Date: May 1, 2020

(87) PCT Pub. No.: WO2019/093407
PCT Pub. Date: May 16, 2019

(65) Prior Publication Data
US 2020/0354100 A1    Nov. 12, 2020

(30) Foreign Application Priority Data

Nov. 8, 2017  (JP) .............................. JP2017-215467
Oct. 31, 2018  (JP) .............................. JP2018-204607

(51) Int. Cl.
*B32B 41/00* (2006.01)
*B65C 9/26* (2006.01)
(Continued)

(52) U.S. Cl.
CPC .............. *B65C 9/26* (2013.01); *B65C 9/1884* (2013.01); *B65C 9/02* (2013.01); *B65C 9/40* (2013.01);
(Continued)

(58) Field of Classification Search
CPC ........... B65C 9/26; B65C 9/1884; B65C 9/02; B65C 9/40; B65C 2009/0053; B65H 2701/192
(Continued)

(56) References Cited

U.S. PATENT DOCUMENTS

| 2,492,908 A | 12/1949 | Von Hofe |
| 2009/0133815 A1 | 5/2009 | Okuno et al. |

FOREIGN PATENT DOCUMENTS

| CN | 107235200 A | 10/2017 |
| DE | 38 31 392 A1 | 3/1990 |

(Continued)

OTHER PUBLICATIONS

Notice of Reasons for Refusal issued in Japan Patent Application No. 2018-204607, dated Jan. 31, 2019, along with an English translation thereof.

(Continued)

*Primary Examiner* — Michael N Orlando
*Assistant Examiner* — Joshel Rivera
(74) *Attorney, Agent, or Firm* — Greenblum & Bernstein, P.L.C.

(57) ABSTRACT

A product transfer apparatus includes a product suction pad part having a suction cup part capable of sucking a plate-like product, a transfer base whose lower part has the product suction pad part, and a label suction part having a label pad, which is able to suck a label to be pasted to the product, and an up-down function of moving the label pad up and down between a position upper than and a position lower than the position of a front end of the suction cup part.

11 Claims, 25 Drawing Sheets

(51) Int. Cl.
*B65C 9/18* (2006.01)
*B65C 9/02* (2006.01)
*B65C 9/40* (2006.01)
*B65C 9/00* (2006.01)

(52) U.S. Cl.
CPC ............... *B65C 2009/0053* (2013.01); *B65H 2701/192* (2013.01)

(58) Field of Classification Search
USPC .............. 156/60, 64, 350, 351, 378, 379
See application file for complete search history.

(56) References Cited

FOREIGN PATENT DOCUMENTS

| | | |
|---|---|---|
| DE | 195 45 191 A1 | 6/1997 |
| EP | 0 911 263 A2 | 4/1999 |
| FR | 2 622 837 B1 | 3/1990 |
| JP | 59-41504 U | 3/1984 |
| JP | 7-40951 A | 2/1995 |
| JP | 2001-183984 A | 7/2001 |
| JP | 2003-170330 A | 6/2003 |
| JP | 2005-225082 A | 8/2005 |
| JP | 2007-137471 A | 6/2007 |
| JP | 2009-83908 A | 4/2009 |
| WO | 2008/139409 A2 | 11/2008 |
| WO | 2017/076522 A1 | 5/2017 |

OTHER PUBLICATIONS

Decision to Grant a Patent issued in Japan Patent Application No. 2018-204607, dated Aug. 8, 2019, along with an English translation thereof.
Written Opinion issued in PCT/JP2018/041439, dated Jan. 22, 2019.
International Search Report issued in PCT/JP2018/041439, dated Jan. 22, 2019, along with an English translation thereof.
China Official Action issued in CN Application No. 201880072212.7, dated Nov. 25, 2020.
European Official Action issued in EP Application No. 18875194.5, dated Dec. 10, 2020.

FIG. 3
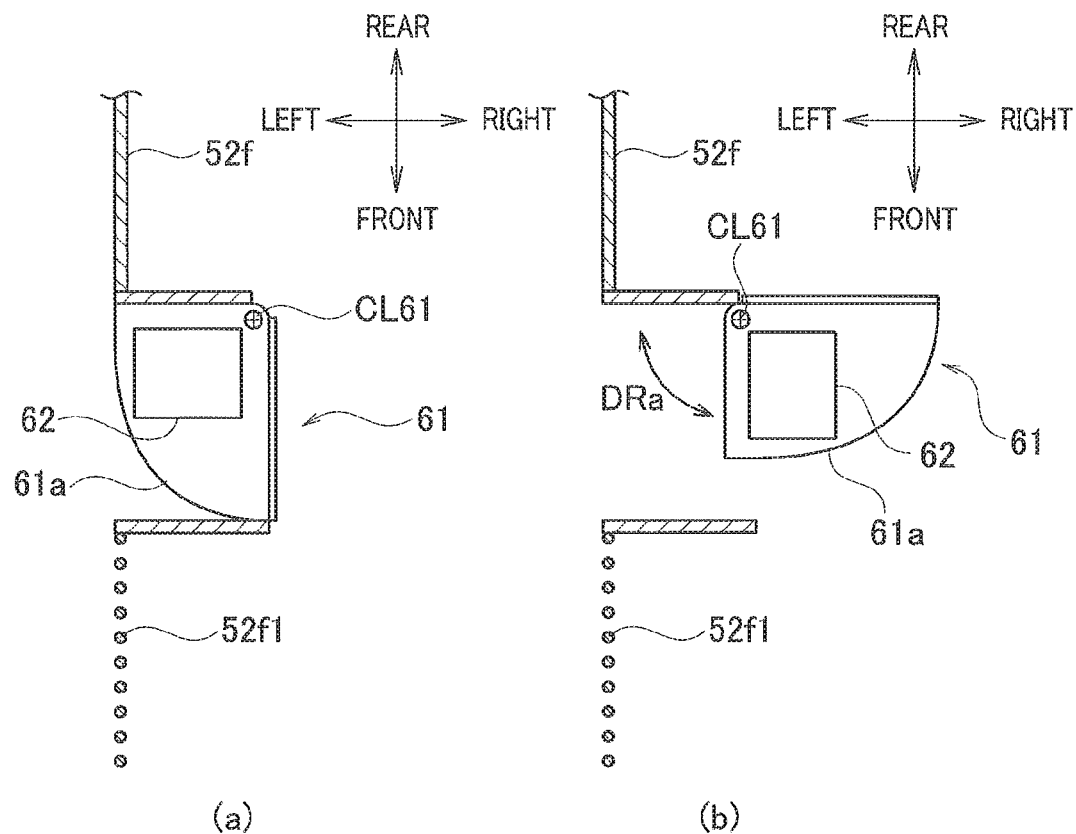
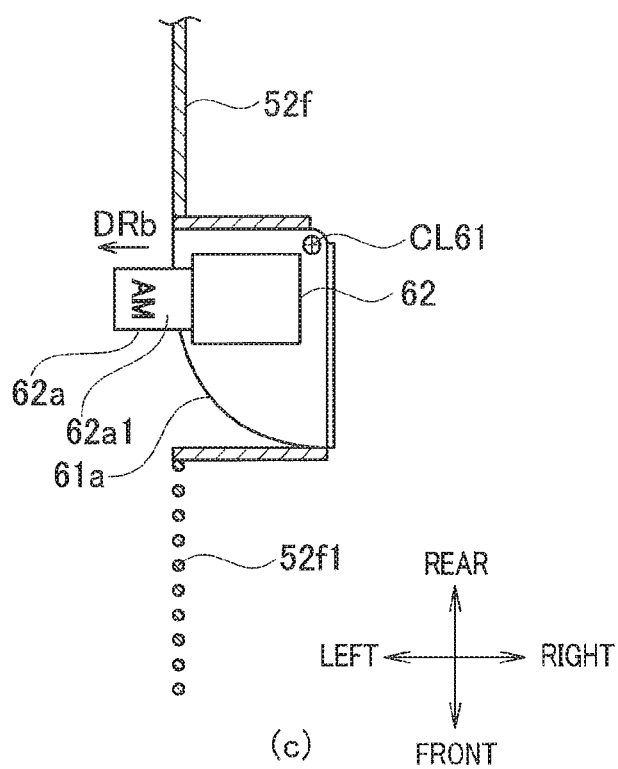

FIG. 4
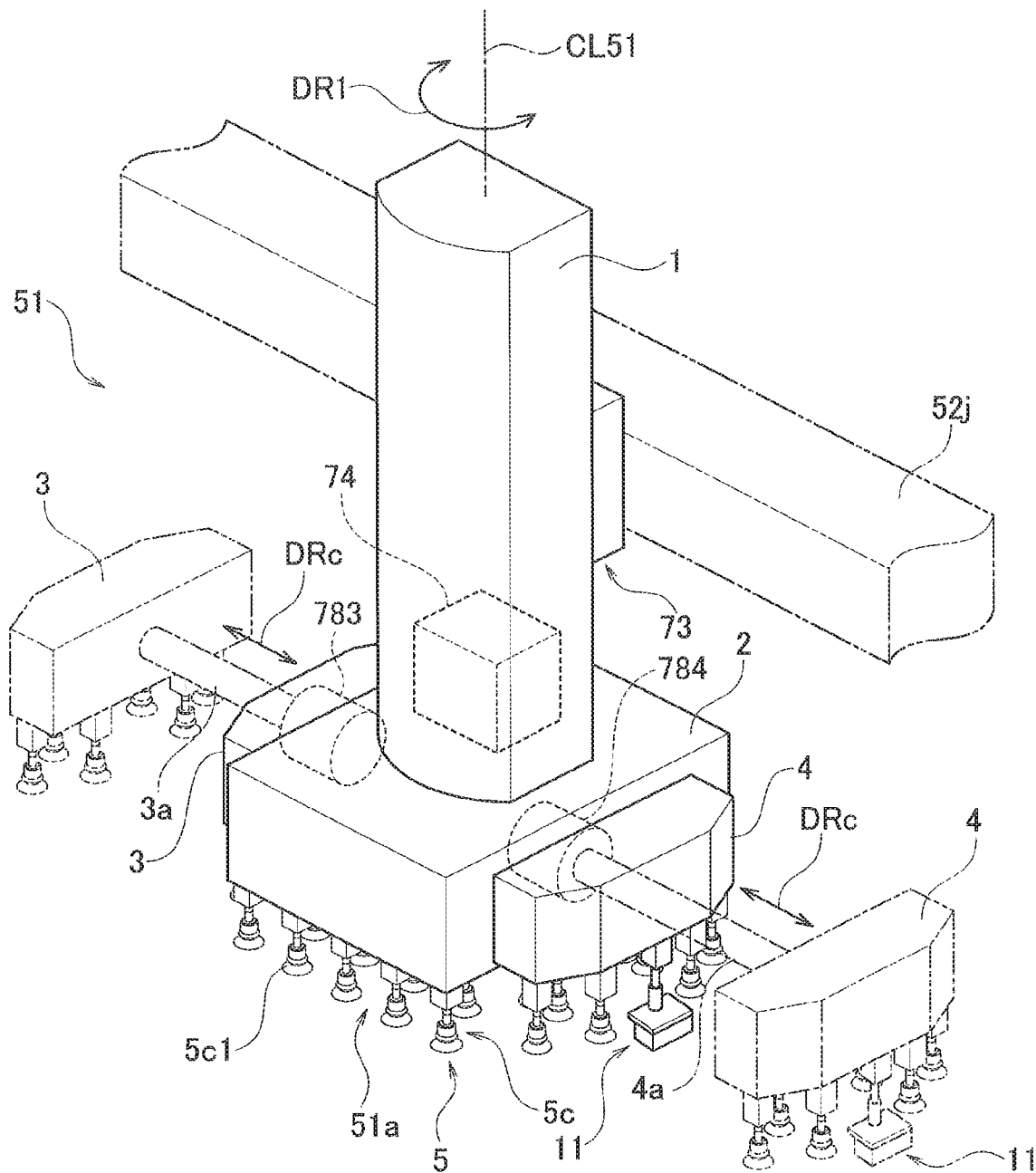
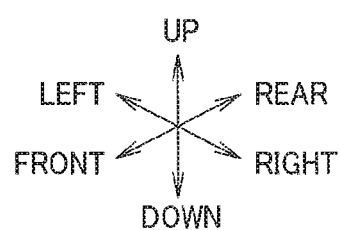

FIG. 20
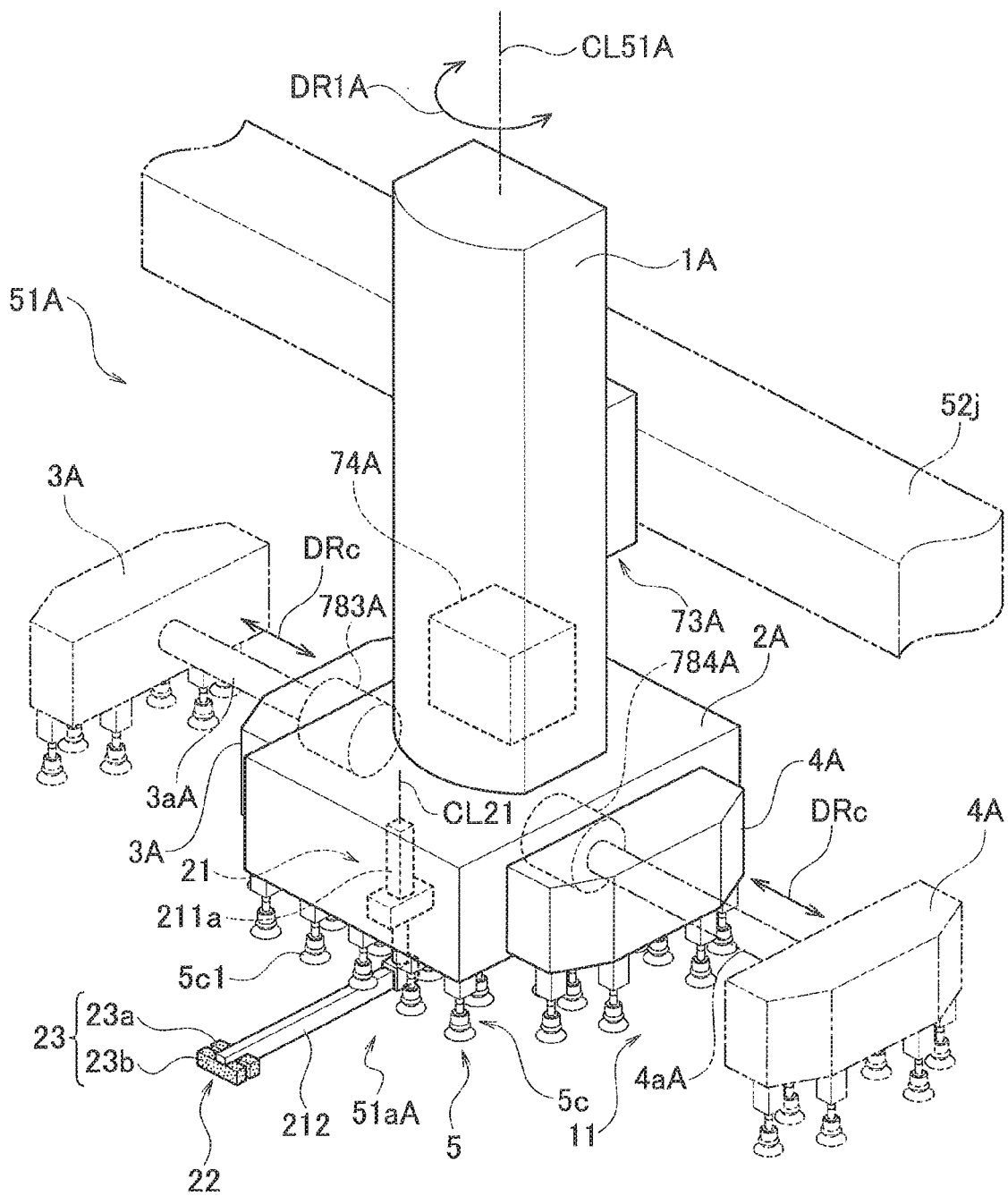
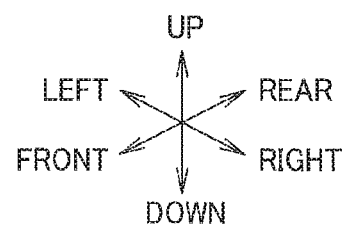

FIG. 26
⟨THIRD POSITION PS3⟩
(a)
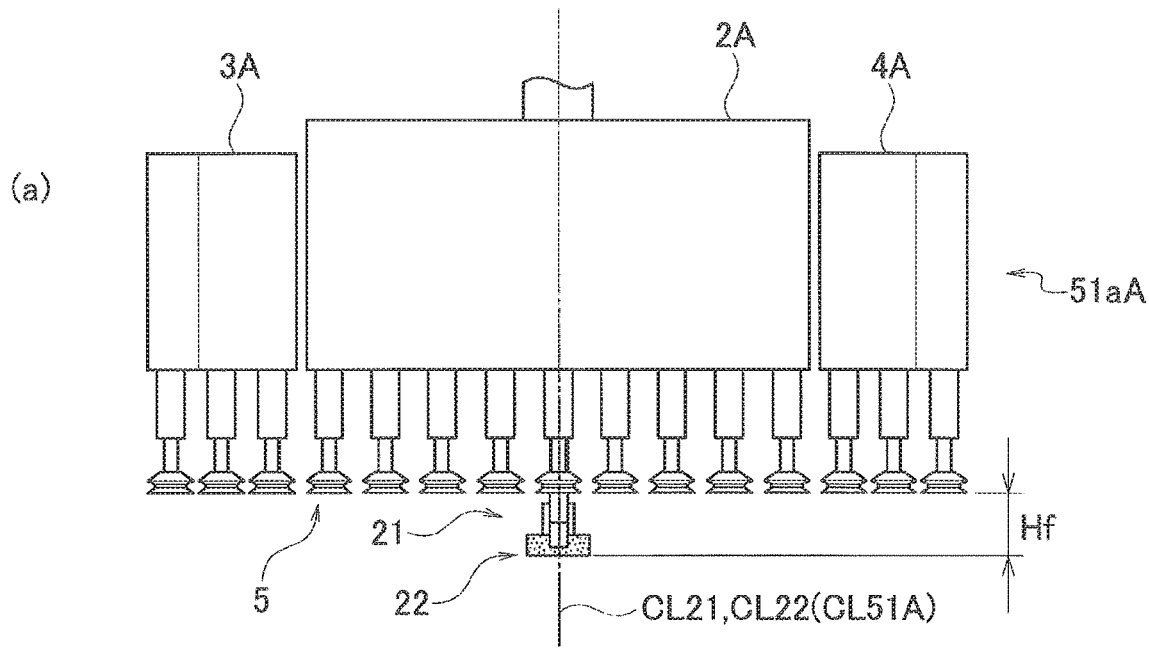
(b)
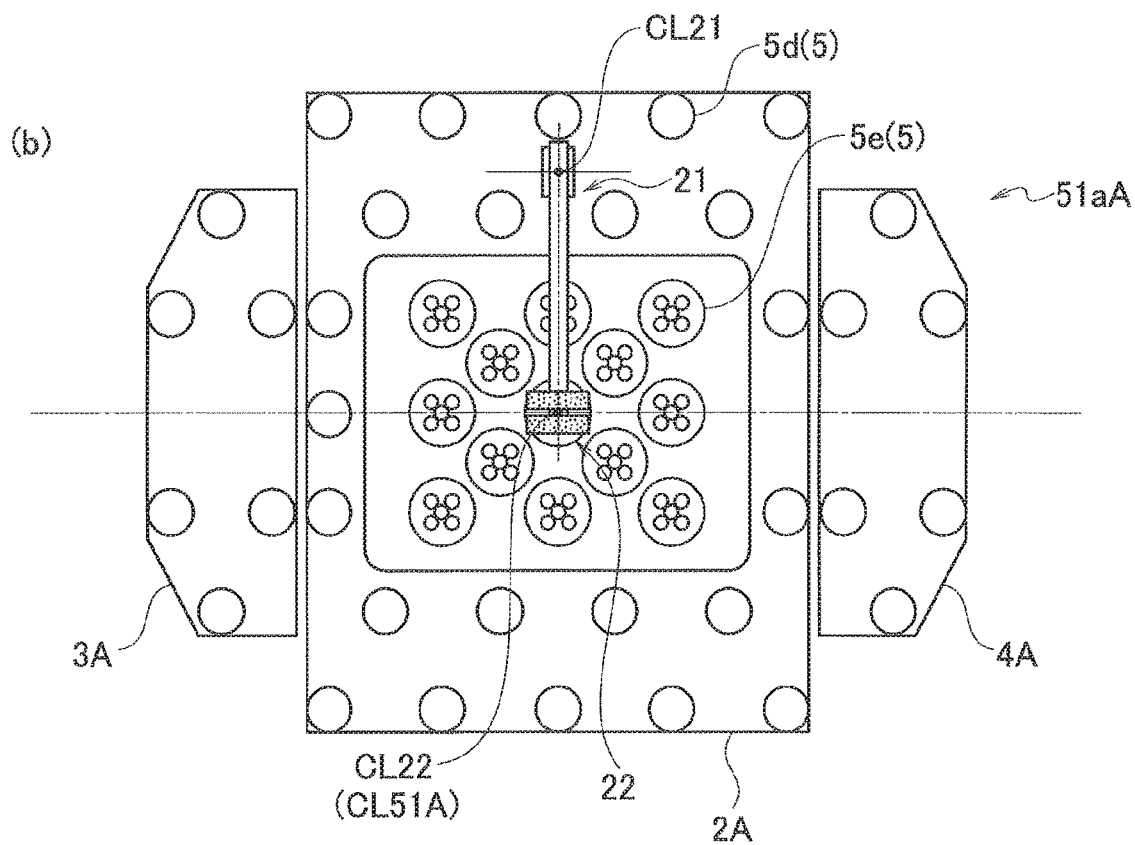

FIG. 27
⟨FOURTH POSITION PS4⟩
(a)
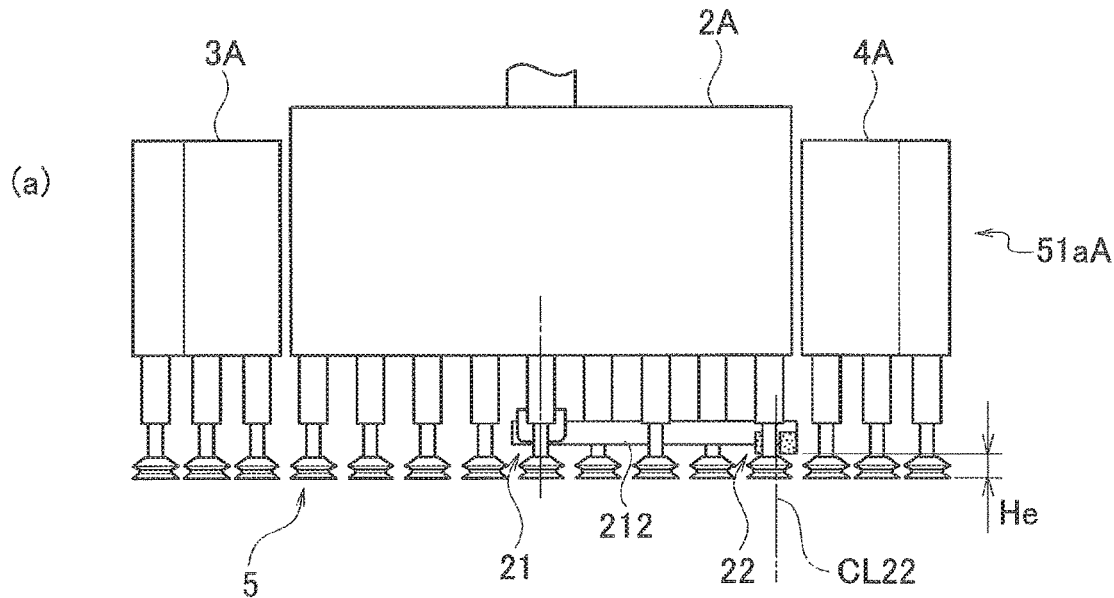
(b)
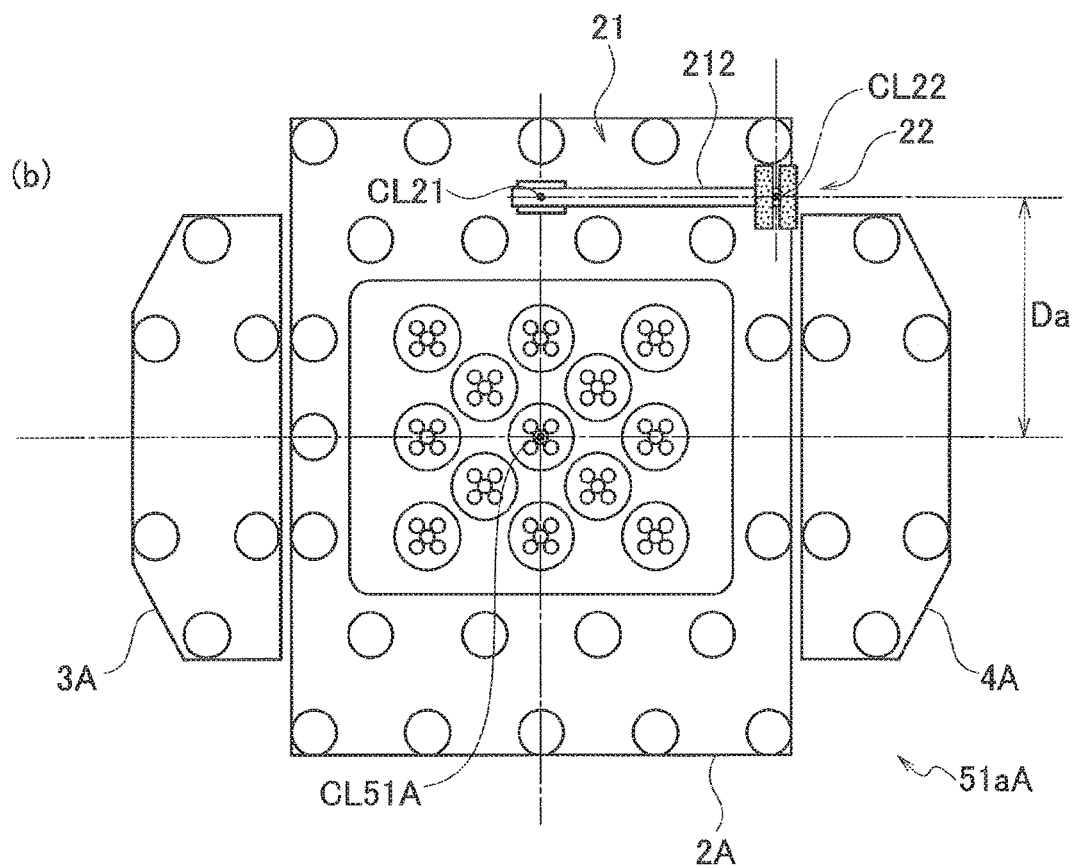

PRODUCT TRANSFER APPARATUS AND PRODUCT TRANSFER SYSTEM

TECHNICAL FIELD

The present invention relates to a product transfer apparatus and a product transfer system, for pasting a label on a product and transferring the product, the product being obtained from a plate material, i.e., a raw material by cutting or the like.

BACKGROUND ART

When carrying, to the outside, products cut from a plate material by a plate material processing machine, labels stating information about the products for individually identifying the products are pasted as required on the products.

Patent Literature 1 mentions about a plate material transfer device having a function of pasting a label on the surface of a product, which is cut by a plate material processing machine, during a conveying process of the product.

The plate material transfer device mentioned in Japanese Unexamined Patent Application Publication No. 2003-170330 (Patent Literature 1) has a plurality of suction pads that suck a plate-like product and are horizontally and vertically movable. The plurality of suction pads are configured to suck a product, and with some of them, a label. With this, the plate material transfer device is able to suck a product, and at the same time, paste a label on the product.

SUMMARY OF INVENTION

Problems to be Solved by Invention

The suction pad to suck a product usually has a side face shape of a flat truncated cone and is made of a thin rubber material. On the other hand, the label is formed from a paper or a resin film into a thin sheet.

Accordingly, when the suction pads mentioned in the Patent Literature 1 suck a label, the label is deformed such that a central part thereof is raised by suction, to cause wrinkles and the like when pasted, thereby causing concern in quality of the pasted label.

Also, since the label is pasted on the product within a suction range of a plurality of the suction pads, the pasting position and orientation of the label on the product are limited.

Means to Solve Problems

The present invention can provide a product transfer apparatus and a product transfer system, capable of pasting a label on a plate-like product at an optional position in an optional orientation without causing a pasting quality problem.

According to a technical aspect of the present invention, the product transfer apparatus is characterized by including a product suction pad part having a suction cup part capable of sucking a plate-like product, a transfer base whose lower part has the product suction pad part, and a label suction part having a label pad, which is able to suck a label to be pasted on the product, and an up-down function of moving the label pad up and down between a position upper than and a position lower than the position of a front end of the suction cup part.

According to another technical aspect of the present invention, the product transfer system is characterized by including a work pallet that supports a plate-like product, a printer that discharges a label printed with information of the product, and a product transfer apparatus that has a product suction pad part having a suction cup part capable of sucking the product, a transfer base whose lower part has the product suction pad part, and a label suction part having a label pad to suck the label discharged from the printer and moving the label pad up and down between a position upper than and a position lower than the position of a front end of the suction cup part.

BRIEF DESCRIPTION OF DRAWINGS

FIG. 3 illustrates sectional views at a S3-S3 position of FIG. 1, to explain a printer box 61 provided for the product transfer apparatus 52, in which (a) and (b) are views illustrating a use position and rotated position of a rotatable shelf plate 61a and (c) is a view explaining operation of a printer 62.

FIG. 4 is a perspective view illustrating a TK unit 51 provided for the product transfer apparatus 52.

FIG. 19(a) is a bottom view illustrating a modification 162a of the label 62a and FIG. 19(b) is a perspective view explaining a state of the printer 62 in the case of using the label 162a.

FIG. 20 is a perspective view illustrating a TK unit 51A according to Embodiment 2.

FIG. 26 illustrates a third position PS3 of the arm 212 on the product suction part 51aA, in which (a) is a front view and (b) a bottom view.

FIG. 27 illustrates a fourth position PS4 of the arm 212 on the product suction part 51aA, in which (a) is a front view and (b) a bottom view.

MODE OF IMPLEMENTING INVENTION

Figure 1:
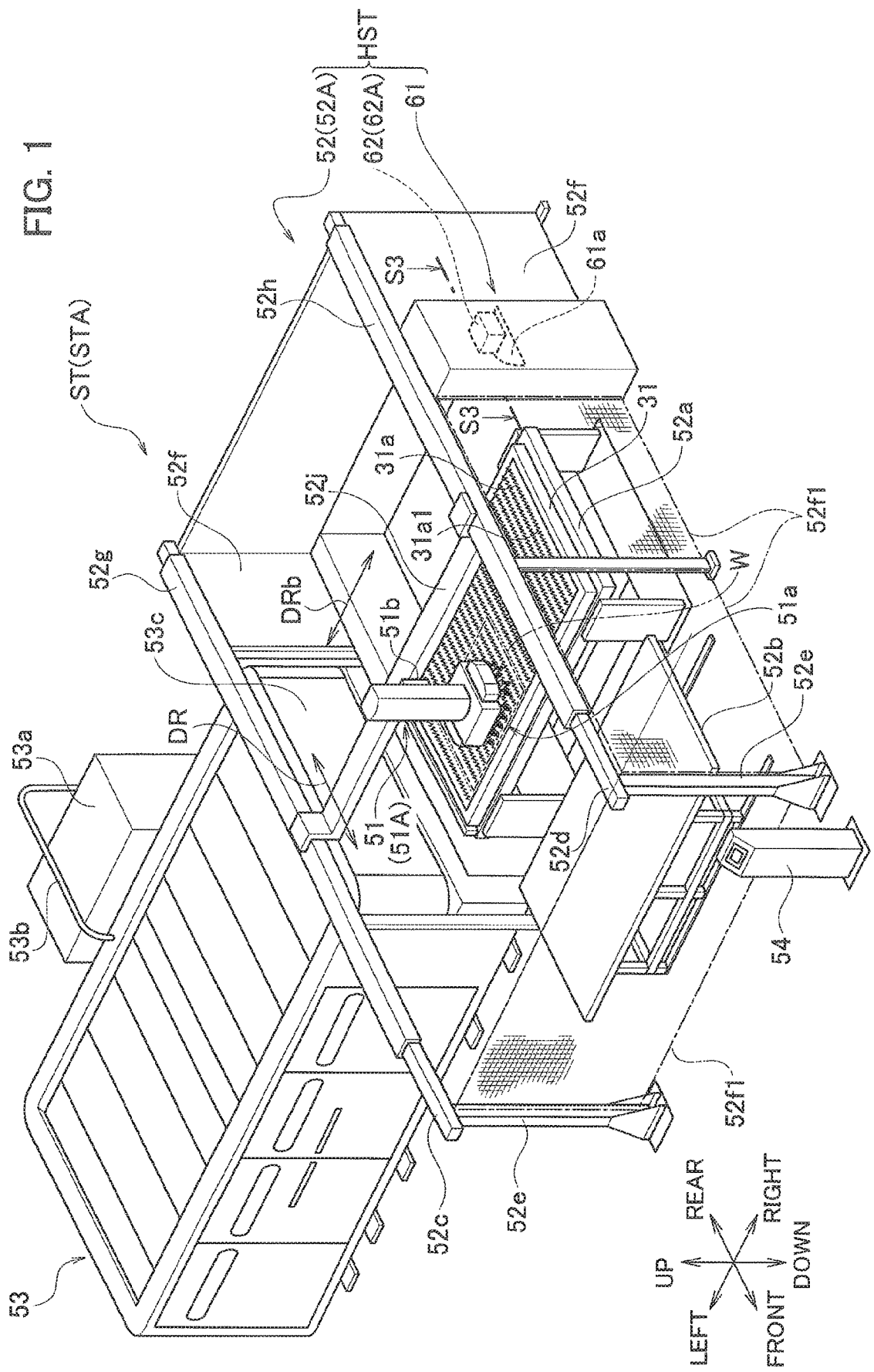
FIG. 1 is a schematic perspective view explaining a general configuration of a laser processing system ST including a product transfer apparatus 52 that is Embodiment 1 of a product transfer apparatus according to the present invention.

A product transfer apparatus and a product transfer system according to implementing modes of the present invention will be explained with reference to the Embodiments 1 and 2.

As the Embodiment 1, FIGS. 1 to 19 are referred to, to explain a product transfer apparatus 52 provided with a TK unit 51 (takeout loader unit 51) and a laser processing system ST that includes the product transfer apparatus 52. As the Embodiment 2, FIGS. 20 to 33 are referred to, to explain a product transfer apparatus 52A provided with a TK unit 51A acting as a label pasting device and a laser processing system STA that includes the product transfer apparatus 52A.

Embodiment 1

A general configuration of the laser processing system ST including the product transfer apparatus 52 of the Embodiment 1 will be explained with reference to FIG. 1 which is a perspective view and FIG. 2 which is a block diagram. For convenience of explanation, up, down, left, right, front, and rear directions are defined as indicated with arrows in FIG. 1. An up-down direction is a vertical direction and the front is a worker standing side.

The laser processing system ST is constituted by including a laser processing machine 53, the product transfer apparatus 52, and a control device 54.

The product transfer apparatus 52 is arranged adjacent to any one of the left and right (the right side in FIG. 1) of the laser processing machine 53.

The control device 54 controls overall operation of the laser processing system ST.

Between the laser processing machine 53 and the product transfer apparatus 52, it is possible to arrange a shelf unit that is able to store work pallets in multiple layers.

The laser processing machine 53 has a laser oscillator 53a and a laser processing head (not illustrated) to emit a laser beam generated by the laser oscillator 53a.

The laser oscillator 53a is, for example, a fiber laser. The laser beam generated by the laser oscillator 53a is supplied through a process fiber 53b to the laser processing head.

The laser processing machine 53 is able to move a work pallet 31 (refer to FIG. 7, too), on which a work W is placed, in a left-right direction in the laser processing machine 53, and also, is able to move the laser processing head in front-rear and up-down directions.

Further, the laser processing machine 53 has, on a right side face in FIG. 1, a pallet gate 53c to pass the work pallet 31 in and out so that the work pallet 31 is moved into and out of the laser processing machine 53 through the pallet gate 53c.

In a state illustrated in FIG. 1, the work pallet 31 discharged from the laser processing machine 53 toward the product transfer apparatus 52 is holding thereon the work W (indicated with a chain line) serving as a raw material and having a plate-like shape.

In this way, the laser processing machine 53 is configured to be able to emit a laser beam from the laser processing head set at an upper position toward an optional portion of the work W placed on the work pallet 31 and conduct laser processing.

The product transfer apparatus 52 has a pallet table 52a and a transfer table 52b.

The pallet table 52a is arranged on the adjacent right of the laser processing machine 53 at a position corresponding to the pallet gate 53c.

The transfer table 52b is arranged in front of and in parallel with the pallet table 52a.

In FIG. 1, the work pallet 31 is illustrated in a state moved onto the pallet table 52a.

The product transfer apparatus 52 is provided with a pair of top frames 52c and 52d. The pair of top frames 52c and 52d are supported with a plurality of support posts 52e and wall parts 52f in a state that they are left-right separated away from each other and are extended in parallel with each other in the front-rear direction.

Also, the product transfer apparatus 52 has fences 52f1 in a front area and rightward area as indicated with chain lines in FIG. 1. The fences 52f1 are net-like grid fences to prevent workers from entering.

On a right side face of the product transfer apparatus 52 between the wall part 52f and the fence 52f1, a printer box 61 is arranged to protrude in a right outward direction.

On a middle stage in the up-down direction of the printer box 61, a shelf plate 61a is arranged, and on the shelf plate 61a, a printer 62 is arranged.

FIG. 3 is a top view sectioned at a position S3-S3 of FIG. 1 and explaining an arranged state of the printer 62 in the printer box 61.

The printer 62 is set on the shelf plate 61a that is rotatable around a printer rotation axis CL61 (FIG. 3(b): an arrow DRa) extending in the up-down direction.

Depending on rotation and rotation lock of the shelf plate 61a, the printer 62 is kept at a use position illustrated in FIG. 3(a) and a maintenance position illustrated in FIG. 3(b).

As illustrated in FIG. 3(c), the printer 62 at the use position prints information (for example, character information "AM") transmitted from the control device 54 on a surface 62a1 of a label 62a whose back face is adhesiveprocessed, discharges the label with the printed face (surface) upwardly oriented until the label substantially wholly protrudes on the pallet table 52a, and maintains this state.

Here, the label 62a is provided for printing in a state that half-cut labels of a predetermined size are regularly adhered to a rolled release paper.

And, the printer 62 is configured to, when discharging the printed label 62a from the printer 62, downwardly steeply fold and rewind the release paper in the vicinity of a discharge port.

With this, the pushed-out label 62a is kept in a substantial overhung state that only a part of a rear end side thereof is attached to the release paper. Further, the printer 62 is provided with an air jetting part (not illustrated) to blow air from below so that a forefront side (front end side) of the protruding part of the label 62a may not sag due to its own weight, thereby substantially horizontally keeping the label 62a.

Figure 7:
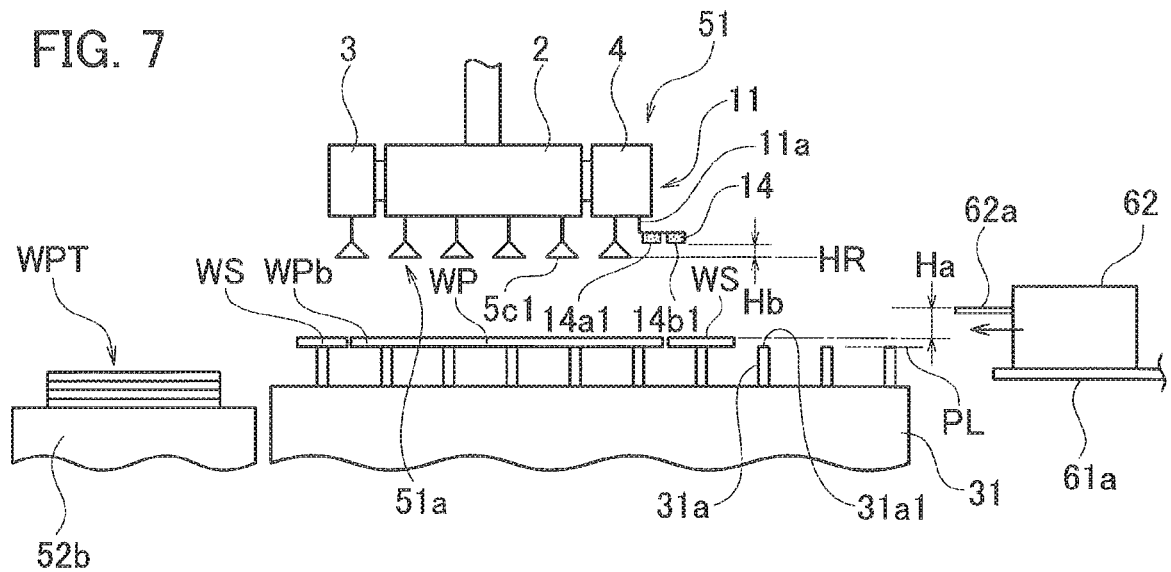
FIG. 7 is a first view explaining a label pasting operation by the TK unit 51.

An up-down-direction position of the protruding label 62a is set to be above a pass line PL (refer to FIG. 7). This up-down-direction position is, as illustrated in FIG. 7, a position higher by a distance Ha from a top face WPb of the product WP placed on the pass line PL.

Returning to FIG. 1, the pair of top frames 52c and 52d are arranged at positions corresponding to a width of the pallet table 52a.

Also, the pair of top frames 52c and 52d have rails 52g and 52h within a range corresponding at least to a front-rear-direction length of the pallet table 52a and transfer table 52b.

The rails 52g and 52h support a movable frame 52j extending in the left-right direction so that the movable frame 52j is movable in the front-rear direction (an arrow DR). The movable frame 52j supports the TK unit 51 so that the TK unit 51 is movable in the left-right direction (an arrow DRb).

Figure 2:
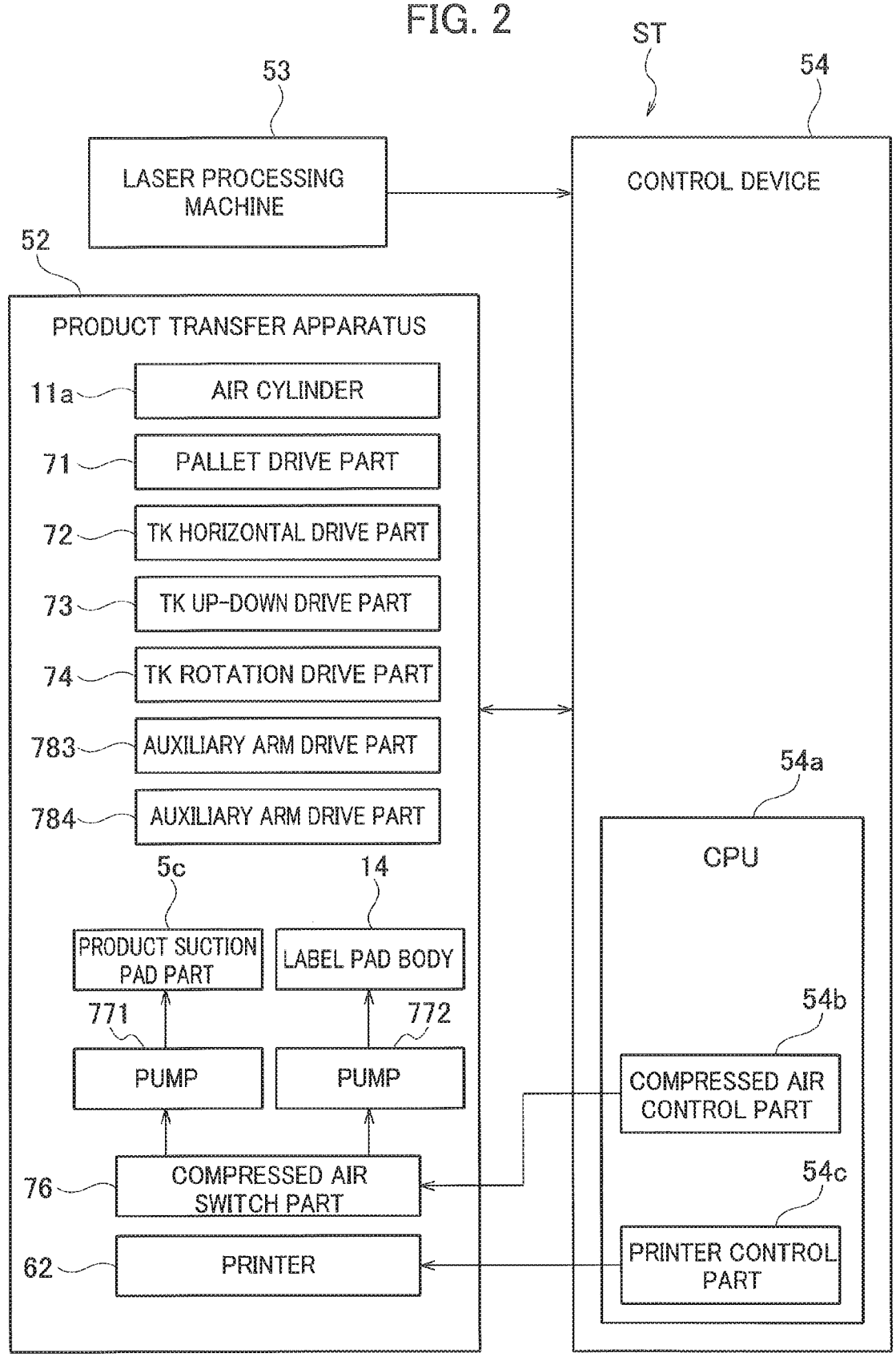
FIG. 2 is a block diagram illustrating a configuration of the laser processing system ST.

As illustrated in FIG. 2, the product transfer apparatus 52 is provided with a pallet drive part 71, a TK horizontal drive part 72, a TK up-down drive part 73, and a TK rotation drive part 74.

The pallet drive part 71 moves, under the control of the control device 54, the work pallet 31 in the left-right direction between the pallet table 52a and an inner position of another device (for example, the inside of the laser processing machine 53).

The TK horizontal drive part 72 executes, under the control of the control device 54, a front-rear movement of the movable frame 52j on the rails 52g and 52h and a left-right movement of the TK unit 51 on the movable frame 52j.

Due to the operation of the TK horizontal drive part 72, the TK unit 51 is movable to above an optional position of the pallet table 52a and transfer table 52b and to the vicinity of the printer 62 positioned at the use position.

As illustrated in FIG. 4, the TK unit 51 is provided with, at a lower part thereof, a product suction part 51a as a transfer base including a base part 2 having a plurality of product suction pad parts 5c. The product suction pad parts 5c are able to suck a plate-like member such as the product WP.

The TK up-down drive part 73 illustrated in FIGS. 2 and 4 moves the product suction part 51a up and down with respect to the movable frame 52j. The TK rotation drive part 74 illustrated in FIGS. 2 and 4 rotates the product suction part 51a around a vertically extending rotation axis CL51 within a total angular range of 360 degrees, for example, a 180-degree angular range in each of the left and right directions at the maximum.

The operations of the TK up-down drive part 73 and TK rotation drive part 74 are controlled by the control device 54.

As illustrated in FIG. 2, the control device 54 has a central processing unit (CPU) 54a including a compressed air control part 54b and a printer control part 54c.

With the above-mentioned configuration, the product transfer apparatus 52 is able to transfer, to the transfer table 52b, the product WP from among the product WP and a skeleton WS (refer to FIG. 7), i.e., a remainder that are conveyed from the laser processing machine 53 and placed on the work pallet 31.

As a concrete operation, the TK unit 51 is moved to above the product WP and is lowered. Next, the product suction part 51a is made to suck the product WP, is thereafter raised and horizontally moved to above the transfer table 52b, and thereafter, is lowered and made to release the suction. As a result, the product WP is transferred from the work pallet 31 to the transfer table 52b.

As illustrated in FIG. 1, the work pallet 31 is a rectangular pallet on which a plurality of skids 31a are arranged, the skid 31a being a metal plate having a plurality of upwardly pointed cusp parts 31a1. The work W placed on the work pallet 31 is supported with a plurality of the cusp parts 31a1.

A detailed structure of the TK unit 51 will be explained with reference to mainly FIGS. 4 to 6.

First, FIG. 4 is a perspective front view illustrating the TK unit 51 illustrated in FIG. 1 and seen from a slightly oblique upper right position. The movable frame 52j supporting the TK unit 51 is indicated with chain lines.

The TK unit 51 has the already-mentioned TK up-down drive part 73 having a servomotor (not illustrated) and supported with the movable frame 52j, a columnar body part 1 moved up and down by a drive source, i.e., the servomotor of the TK up-down drive part 73 relative to the movable frame 52j, and the product suction part 51a, i.e., the already-mentioned transfer base attached to a lower part of the body part 1.

The product suction part 51a is turned by operation of the already-mentioned TK rotation drive part 74 around the vertically extending rotation axis CL51 (refer to an arrow DR1) with respect to the body part 1. A rotation range is, for example, 180 degrees clockwise and counterclockwise, 360 degrees in total from the state illustrated in FIG. 4. In connection with this, the rotation axis CL51 is hereunder called a transfer base rotation axis CL51.

The product suction part 51a, i.e., the transfer base is provided with the base part 2 and a pair of auxiliary parts 3 and 4. The base part 2 is substantially formed in a hexahedral shape. The pair of auxiliary parts 3 and 4 are supported at front ends of support arm parts 3a and 4a that are moved out and in from the left and right of the base part 2, respectively, by operation of auxiliary arm drive parts 783 and 784.

By operation of the auxiliary arm drive parts 783 and 784, the auxiliary parts 3 and 4 are moved between base positions closely attached to the base part 2 and left and right extended positions (refer to arrows DRc). Namely, the auxiliary parts 3 and 4 are able to horizontally move away from and toward the transfer base rotation axis CL51. In FIG. 4, the auxiliary parts 3 and 4 at the base positions are depicted with continuous lines and the auxiliary parts 3 and 4 at the extended positions with chain lines.

Figure 5:
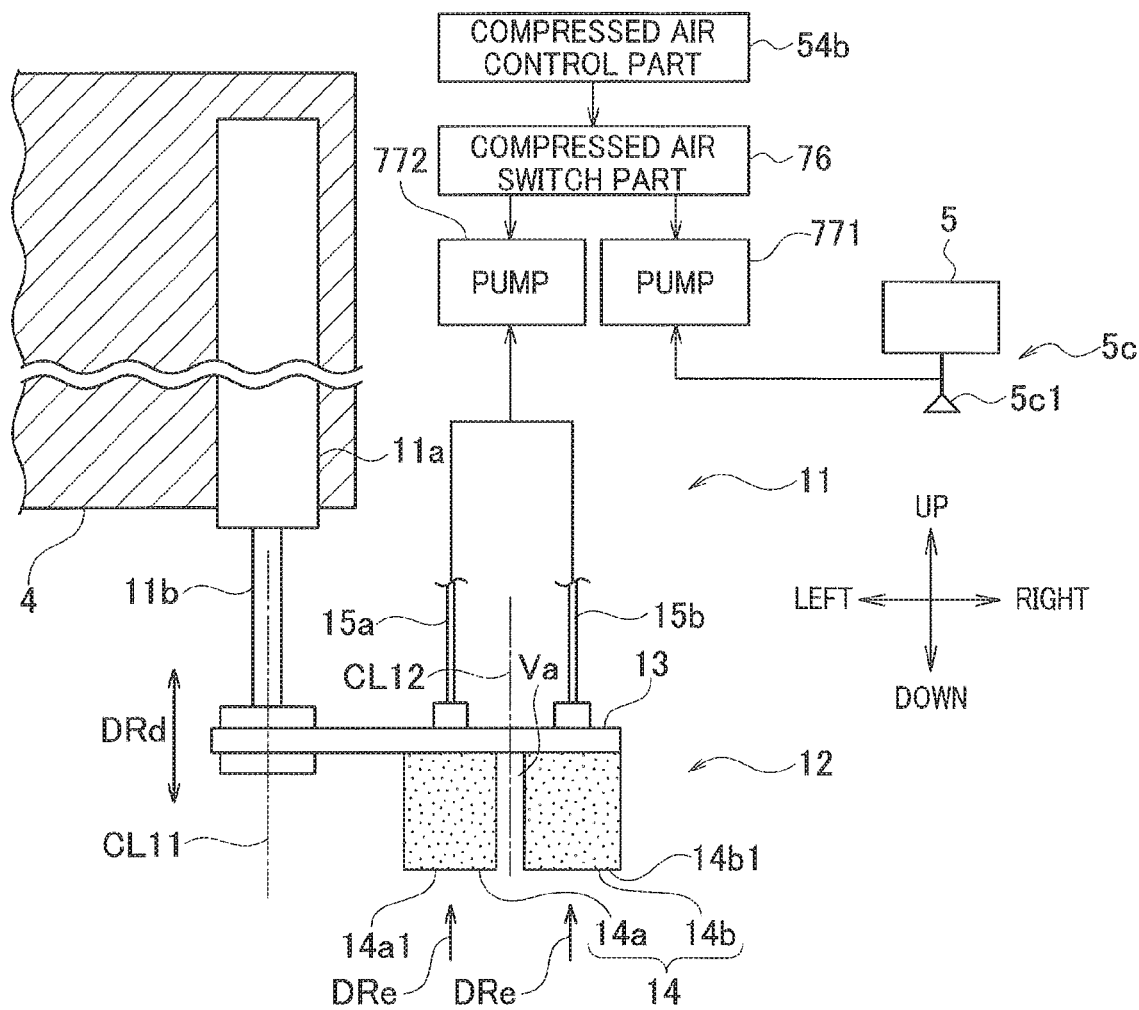
FIG. 5 is a side view illustrating a label suction part 11 provided for the TK unit 51.

As illustrated in FIGS. 4 and 5, there are arranged at lower parts of the base part 2 and auxiliary parts 3 and 4a plurality of suction units 5 having a vertical axis. A lower part of the suction unit 5 is provided with a product suction pad part 5c.

The product suction pad parts 5c are connected to a pump 771 (refer to FIG. 2, too) for generating a negative pressure. Operation of the pump 771 is directly controlled by a compressed air switch part 76. Here, the compressed air switch part 76 is controlled by the compressed air control part 54b of the control device 54.

At a lower front end of the product suction pad part 5c, there is provided a rubber suction cup part 5c1 shaped in a truncated cone circumferential face. With this, operation of the pump 771 produces a negative pressure inside the suction cup parts 5c1 to enable them to suck a flat plate member such as the product WP.

The product suction part 51a is provided with, on one of the auxiliary parts 3 and 4 (the auxiliary part 4 in this example), a label suction part 11 for sucking the label 62a. In more detail, the label suction part 11 is arranged at a front-rear-direction center in the vicinity of a right edge of the auxiliary part 4.

FIG. 5 is a side view of the label suction part 11 and corresponds to a front view of FIG. 1.

The label suction part 11 has an air cylinder 11a having a vertically extending axis CL11 and fixed to the auxiliary part 4, a rod 11b that moves along the axis CL11 out of and into a bottom face of the air cylinder 11a, and a pad part 12 attached to a lower front end part of the rod 11b.

According to operation of the air cylinder 11a under the control of the control device 54, the pad part 12 moves up and down for a predetermined stroke (FIG. 5: an arrow DRd).

The pad part 12 has a base plate 13 of a flat shape whose left edge part is fixed to a front end of the rod 11b and a label pad part 14 attached to a right edge side of a bottom face of the base plate 13. Namely, the base plate 13 is attached to the rod 11b in such a way as to extend in a direction away from the transfer base rotation axis CL51.

In this example, the label pad part 14 is a combination of two label pads 14a and 14b that are juxtaposed in the left-right direction in FIG. 5.

The label pads 14a and 14b are made of the same material and are formed in cuboid sponge bodies elongated in the front-rear direction in FIG. 5 (a front-back direction of the drawing). A material thereof is, for example, a chloroprene rubber sponge body. Accordingly, the label pads 14a and 14b have elasticity at least in the up-down direction.

Figure 6:
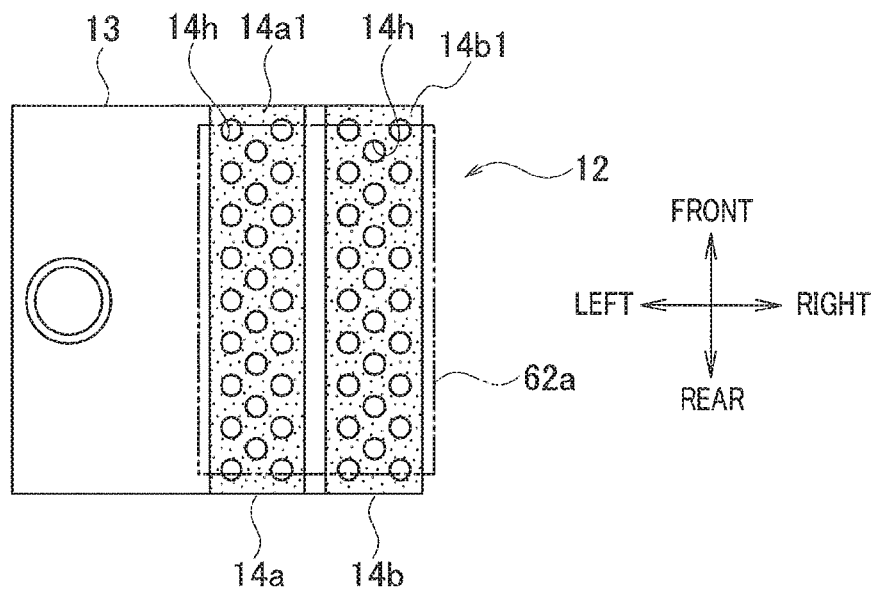
FIG. 6 is a bottom view of the label suction part 11.

FIG. 6 is a bottom view of the pad part 12. As illustrated in FIG. 6, the label pads 14a and 14b have a plurality of vertically passing air holes 14h. In this example, the air holes 14h are arranged in three zigzag lines that are substantially evenly dispersed over each of bottom faces 14a1 and 14b1 of the label pads 14a and 14b.

The air holes 14h are connected to hoses 15a and 15b that are extended from a top face of the base plate 13 and are passed through the base plate 13 to the label pads 14a and 14b, respectively. The hoses 15a and 15b are connected to a pump 772 for generating a negative pressure.

As already mentioned, the compressed air switch part 76 controls operation of the pumps 771 and 772. The compressed air switch part 76 is controlled by the compressed air control part 54b, to selectively execute operation of the pump 771 to suck air from the product suction pad part 5c, or operation of the pump 772 to suck air from the label pad part 14 of the label suction part 11, or operation of the both.

When the compressed air switch part 76 controls to operate the pump 772 so that a negative pressure is applied to the label pad part 14 of the label suction part 11, the air holes 14h of the bottom faces 14a1 and 14b1 of the label pads 14a and 14b draw air (arrows DRe). With this, the bottom faces 14a1 and 14b1 of the label pad part 14 are able to suck the label 62a.

Also, when the compressed air switch part 76 controls to apply a negative pressure to the product suction pad parts 5c of the suction units 5, the suction cup parts 5c1 draw air. With this, the product suction pad parts 5c are able to suck the product WP.

The bottom face 14a1 of the label pad 14a is flat and the size thereof is, for example, 70 (mm)×22 (mm). The label pad 14a and the label pad 14b that is the same as the label pad 14a are juxtaposed with a proper gap Va between them, to form the label pad part 14 usable to suck a rectangular label of 60 (mm) square. In FIG. 6, an outer shape of the label 62a sucked by the label pad part 14 is depicted with a chain line.

The label pads 14a and 14b are each a cuboid and have suction faces, i.e., the flat bottom faces 14a1 and 14b1. With this, the label 62a sucked by the label pad part 14 is never centrally raised or is never deformed when sucked.

The air drawing air holes 14h formed in the bottom faces 14a1 and 14b1 have a relatively small diameter and are substantially evenly distributed. With this, suction force to suck the label 62a is never biased depending on locations over the bottom faces 14a1 and 14b1 and never causes the problem of, for example, dropping the label 62a after suction.

The product transfer apparatus 52 of the above-mentioned configuration is able to suck the product WP with the product suction pad parts 5c of the suction units 5 and is able to move the sucked product WP with the TK unit 51 to an optional position in an optional orientation within the movable range thereof.

Also, with the label suction part 11, the label 62a that is pushed out of the printer 62 and exposed can be sucked and the sucked label 62a can be pasted with the TK unit 51 on a top face WPb of the product WP, which is placed on the work pallet 31, at an optional position in an optional orientation within the movable range of the TK unit 51. In this way, the TK unit 51 is a device for transferring the product WP and is a label pasting device for pasting the label 62a on the product WP.

Explained next is an example of a product transfer operation that is a combined series of the label 62a pasting operation and product WP sucking-and-transferring operation by the TK unit 51. The product transfer operation is a combination of series processes including a label pasting process of pasting the label 62a at a required position on the product WP placed on the work pallet 31 and a product transferring process of transferring the product WP on which the label 62a is pasted to the transfer table 52b.

FIGS. 7 to 14 are schematic side views explaining the product transfer operation including the label pasting process and product transferring process. The operation explained below is controlled by the control device 54. In FIG. 7, an operation start basic state is illustrated.

(Basic State: Refer to FIG. 7)

On a plurality of the skids 31a of the work pallet 31, there are placed in a cut state the product WP and skeleton WS, i.e., a remainder that have been cut from a plate material, i.e., a raw material by, for example, laser processing in a preceding process.

In the basic state, the TK unit 51 is at a raised position and the product suction part 51a is just above the product WP. In the basic state, the air cylinder 11a (refer to FIG. 5) of the label suction part 11 is in a state that the rod 11b is pulled therein. In this state, the bottom faces 14a1 and 14b1 of the label pad part 14 are at a position upwardly separated by a distance Hb from a suction height HR of the suction cup parts 5c1 of the suction units 5.

Also, in the printer 62, an up-down-direction position (height) of the label 62a printed and pushed out of a casing is above the pass line PL and is upwardly spaced by a distance Ha from the top face WPb of the product WP.

On the transfer table 52b, there are a plurality of already transferred products WP stacked one on another to form a product stack WPT.

(Label Pasting Process: Refer to FIGS. 8 to 12)

Figure 8:
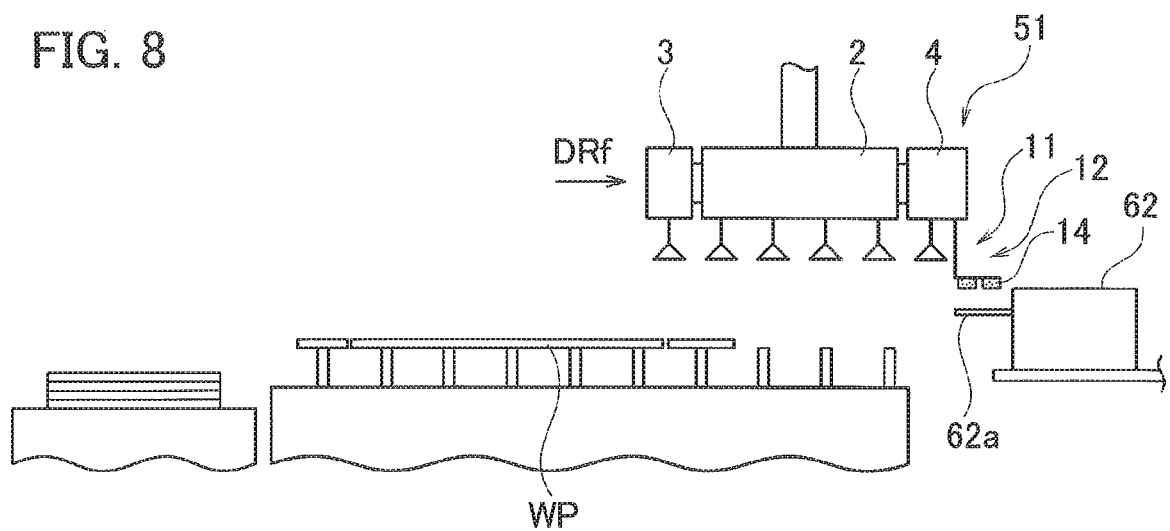
FIG. 8 is a second view explaining the label pasting operation by the TK unit 51.

As illustrated in FIG. 8, the control device 54 horizontally moves (an arrow DRf) the TK unit 51 from the basic state while keeping the raised position and positions the label suction part 11 above the label 62a pushed out of the printer 62.

Figure 9:
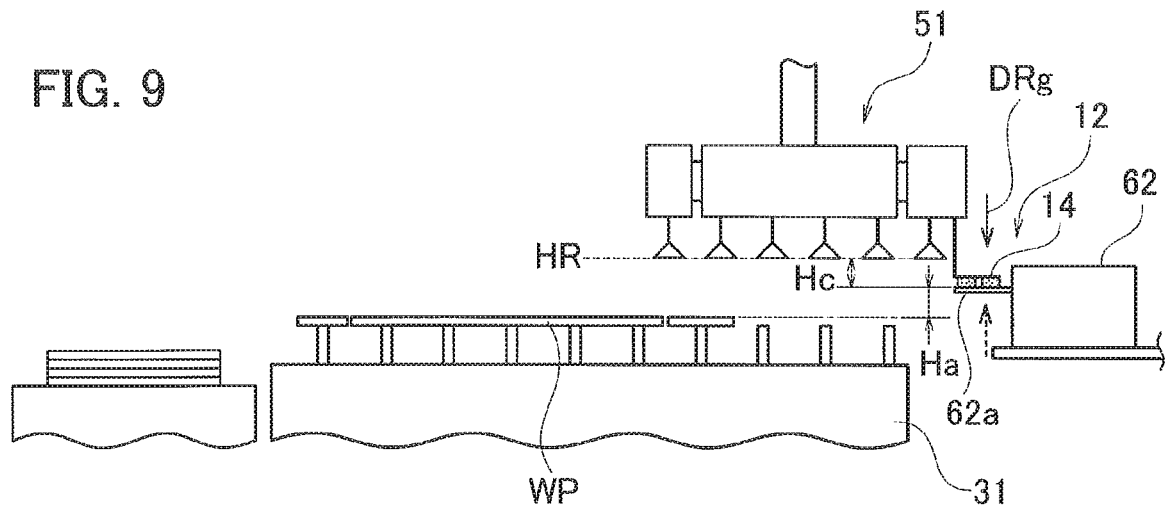
FIG. 9 is a third view explaining the label pasting operation by the TK unit 51.

The air cylinder 11a (refer to FIG. 5) of the label suction part 11 is operated, and as illustrated in FIG. 9, the pad part 12 including the label pad part 14 is lowered (an arrow DRg).

Together with this, the compressed air switch part 76 (refer to FIGS. 2 and 5) connects a negative pressure path to the label pad part 14 so that air suction can be carried out by the label suction part 11.

A height of the TK unit 51 in the basic state is set such that, when the pad part 12 is lowered to a lowest position of the up-down movable range, the bottom faces 14a1 and 14b1 of the label pad part 14 are at a position to contact with or in the vicinity of the label 62a. This position of the bottom faces 14a1 and 14b1 is lower by a distance Hc than the suction height HR of the suction cup parts 5c1.

Namely, by the operation of the air cylinder 11a, the bottom faces 14a1 and 14b1 of the label pad part 14 are lowered to cross the position of the suction height HR of the suction cup parts 5c1 from above to below and are brought into contact with or in the vicinity of a top face of the label 62a.

At least during the descending of the label pad part 14, air suction through the air holes 14h of the label pad part 14 is started. Due to this, the label 62a is drawn by the label pad part 14 as the label pad part 14 approaches close to the label 62a.

As illustrated in FIG. 9, the label 62a drawn by the label pad part 14 is at a position higher by a distance Ha than the top face of the product WP.

Figure 10:
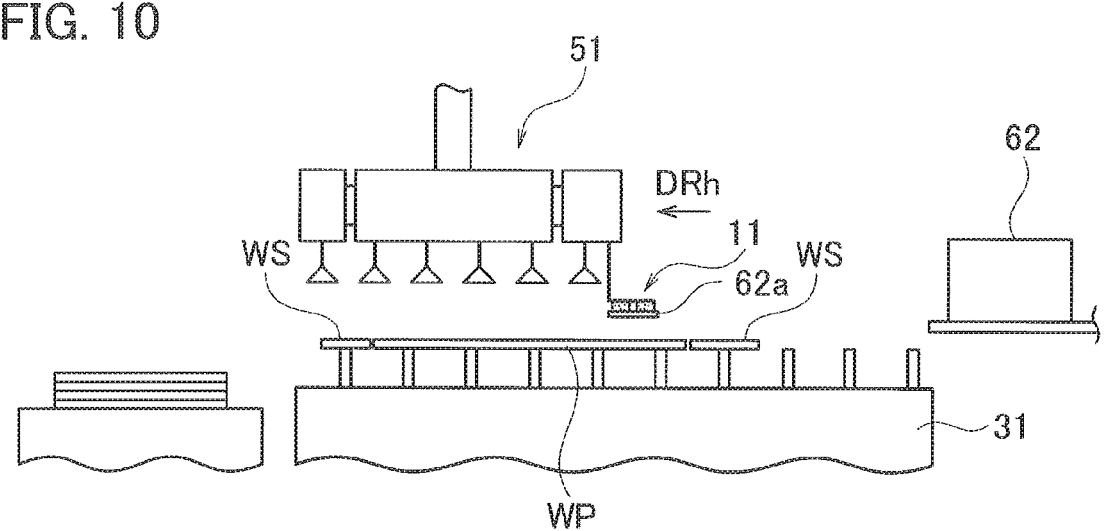
FIG. 10 is a fourth view explaining the label pasting operation by the TK unit 51.

Accordingly, after the label suction part 11 sucks the label 62a, as shown in FIG. 10, the TK unit 51 is horizontally moved without changing the height, to move the label 62a to above a pasting position of the product WP (refer to an arrow DRh of FIG. 10).

The printer 62 operates in harmony with the horizontal movement of the TK unit 51, and just before the start of the horizontal movement, cuts a rear end of the label 62a sucked by the label pad part 14 with a built-in cutter (not illustrated).

Figure 11:
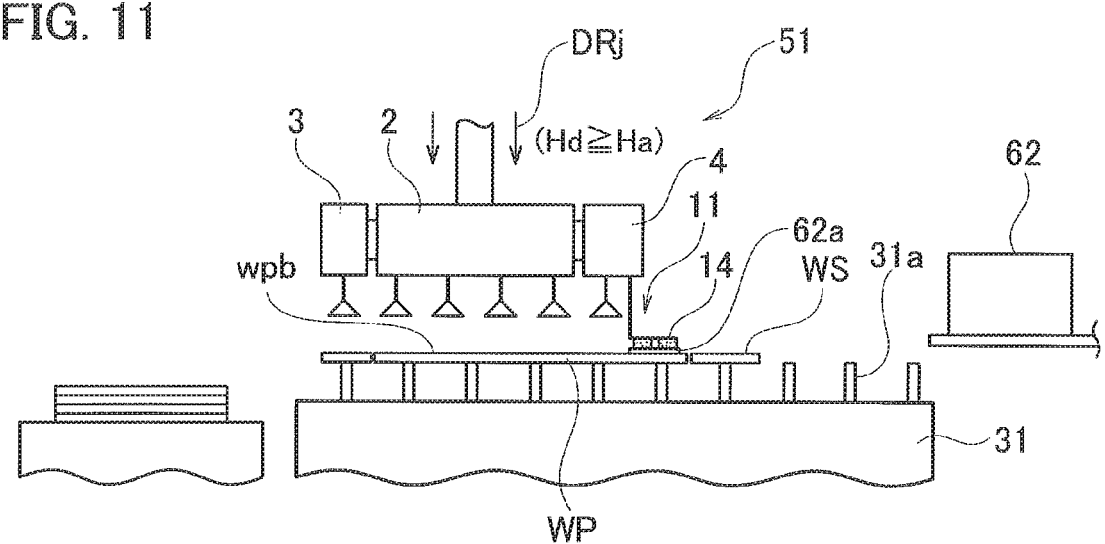
FIG. 11 is a fifth view explaining the label pasting operation by the TK unit 51.

After moving the label 62a sucked by the label pad part 14 to above the pasting position of the product WP, the control device 54 lowers, as illustrated in FIG. 11, the TK unit 51 by a predetermined distance Hd (an arrow DRj). The control device 54, if required, before or during the lowering of the TK unit 51, causes the TK rotation drive part 74 to rotate the TK unit 51 so that the label 62a is oriented in a predetermined direction.

The predetermined distance Hd must be equal to or greater than the distance Ha. Setting the distance Hd to be greater than the distance Ha results in compressing the label pad part 14, and with its resilient repulsive force, pressing the label 62a to the top face WPb of the product WP, and therefore, is preferable.

In more detail, the label pads 14a and 14b are formed from, as already mentioned, elastic sponges. Due to this, the resilient repulsive force generated by compressing the label pad part 14 presses the sucked label 62a to the top face WPb of the product WP through the whole of the bottom faces 14a1 and 14b1. As a result, the label 62a causes no partial lift and is entirely surely pasted to the surface of the product WP, thereby stabilizing and realizing a high pasting quality.

The compressed air control part 54b, after the TK unit 51 is lowered and the label 62a is brought into contact with the product WP, closes the negative pressure path connected to the label pad part 14, to stop the suction through the air holes 14h.

Figure 12:
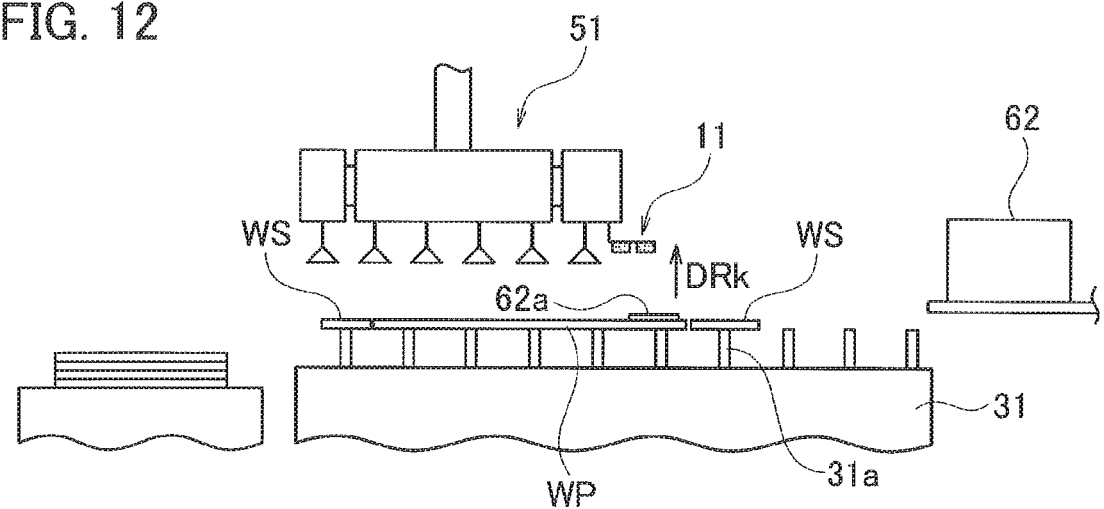
FIG. 12 is a sixth view explaining the label pasting operation by the TK unit 51.

As illustrated in FIG. 12, the control device 54, after pasting the label 62a, operates the air cylinder 11a while maintaining the height position of the TK unit 51, to raise the label suction part 11 (an arrow DRk). Up to here is the label pasting process.

Figure 13:
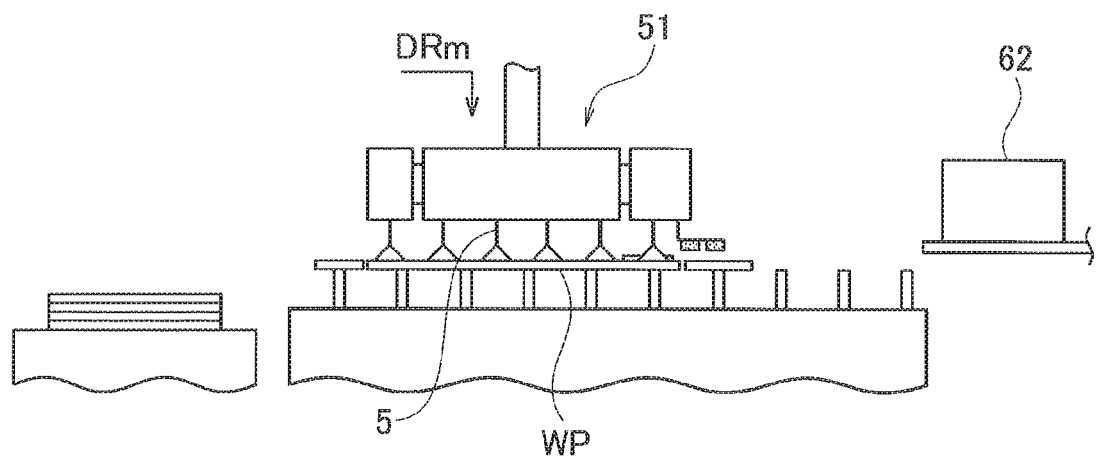
FIG. 13 is a first view explaining a product transfer operation by the TK unit 51.
Figure 14:
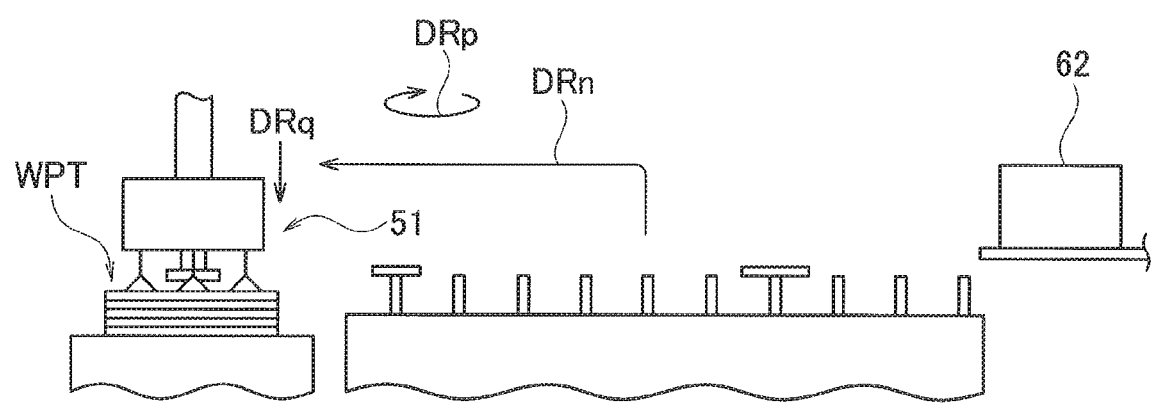
FIG. 14 is a second view explaining the product transfer operation by the TK unit 51.

(Product WP Transferring Process: Refer to FIGS. 13 and 14)

After raising the label suction part 11 to complete the label pasting process, the control device 54 horizontally moves the TK unit 51 to above a suction location (usually, a center) of the product WP, and thereafter, lowers the same (refer to an arrow DRm of FIG. 13).

In more detail, the control device 54 moves the TK unit 51 to above a position set as the suction position of the product WP, operates, if required, the TK rotation drive part 74 to establish a predetermined rotated state, and thereafter, lowers the same.

During the descending of the TK unit 51 at latest, the compressed air control part 54b activates the pump 771 connected to the product suction pad parts 5c, to start air suction by the suction cup parts 5c1. And, on the completion of the descending of the TK unit 51, the product suction pad parts 5c suck the product WP.

After sucking the product WP, the control device 54 raises the TK unit 51 and horizontally moves the same to above the product stack WPT formed on the transfer table 52b (FIG. 14: an arrow DRn). If required, the TK unit 51 is rotated to a predetermined state (FIG. 14: an arrow DRp).

And, the control device 54 lowers the TK unit 51 and places the carried product WP on the product stack WPT. Thereafter, the compressed air control part 54b stops the pump 771 to stop air suction by the suction cup parts 5c1, thereby releasing the product WP.

After releasing the product WP, the control device 54 returns the TK unit 51 to the basic state.

With this, the label pasting process and product transferring process complete.

In the product transfer apparatus 52, a pasting position and pasting state (orientation) of the label 62a on the top face WPb of the product WP are optional.

Figure 15:
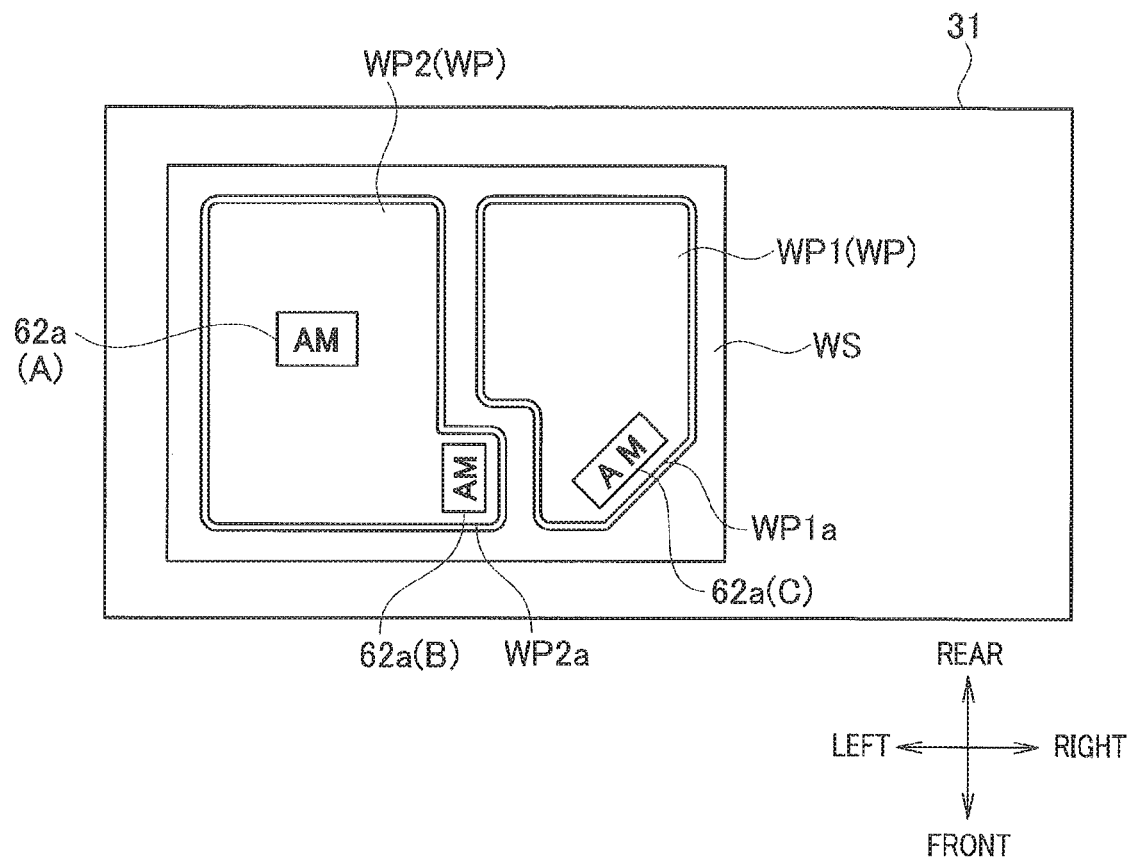
FIG. 15 is a top view explaining pasted states of a label 62a by the TK unit 51.

FIG. 15 is a view illustrating pasted examples of the label 62a on the product WP and skeleton WS, i.e., a remainder that are placed on the work pallet 31. In FIG. 15, as the product WP, two products WP1 and WP2 having different shapes are illustrated.

The product transfer apparatus 52 is able to paste the label 62a on a predetermined part of the top face WPb of the product WP. Here, the predetermined part is a part above which the label suction part 11 can be positioned by the horizontal movement and rotation of the TK unit 51.

For example, as illustrated in FIG. 15, it is possible to achieve (A) pasting the label 62a on a center of the product WP2 and (B) pasting the same on a protruding part WP2a where the product WP2 is partly outwardly extended.

Further, the product transfer apparatus 52 is capable of achieving (C) pasting the label 62a on the product WP1, which has a contour line WP1a slanted in the left-right direction on a horizontal plane, in a slanted orientation along the contour line WP1a.

With this, the product transfer apparatus 52 can paste the label 62a in an optional state at an optional position on the surface of the transferring product WP and can transfer the product WP on which the label 62a is pasted to a predetermined position.

As mentioned above, the product transfer apparatus 52 has, on the TK unit 51, the product suction part 51a, i.e., the transfer base for sucking the product WP and the label suction part 11 having an up-down function of ascending and descending independently of the product suction part 51a.

Accordingly, the pasting of the label 62a on the product WP can be carried out at an optional position and orientation without limitation by the horizontal movement and rotation of the TK unit 51, thereby stably maintaining a high-level pasting quality.

Also, the label suction part 11 has the flat label pads 14a and 14b that are not like suction cups but are like cuboids with label sucking flat faces.

Accordingly, the label 62a is sucked by the label pads 14a and 14b without largely deformed, so that the pasting never causes problems such as wrinkles.

Further, so that the label suction part 11 can stand by at a position higher than the suction height HR at which the product suction part 51a sucks the product WP and can suck, keep, and paste a label at a position lower than the suction height HR, the up-down stroke of the air cylinder 11a and the most raised position and most lowered position of the label pad part 14 within the up-down stroke are set.

With this, in the sucked state of the label 62a, the TK unit 51 as a whole can horizontally move to carry out the product suction operation without influenced by the label suction part 11. Accordingly, even if the label pasting operation is included in the product transferring operation, a label pasting time will be short to prevent the lowering of a product transfer efficiency of the product transfer apparatus 52.

Figure 16:
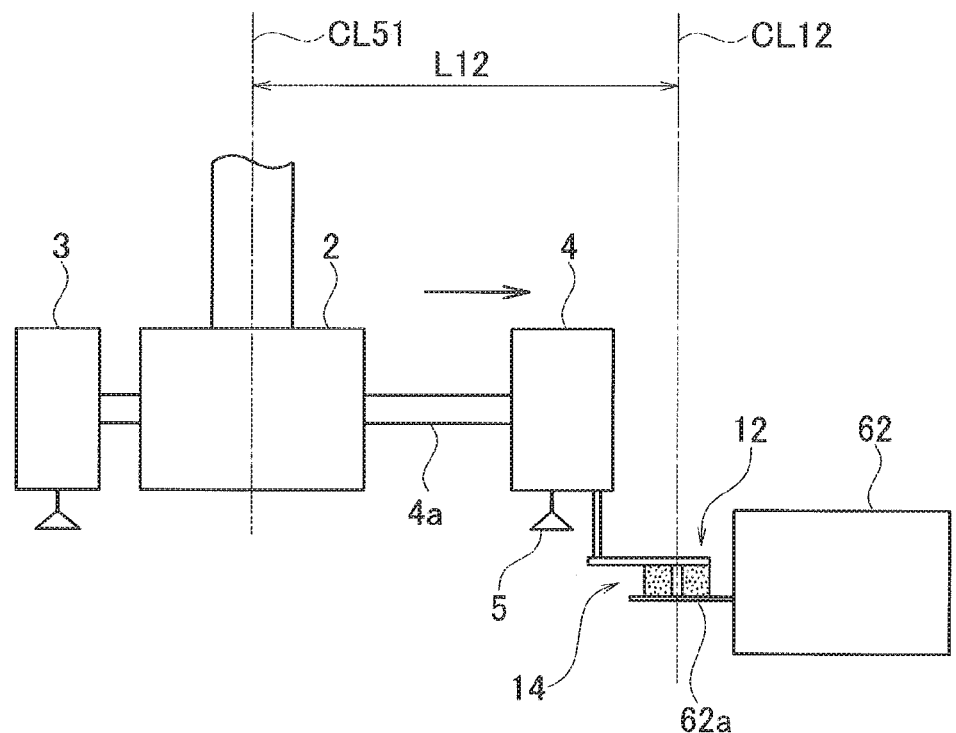
FIG. 16 is a side view explaining a distance from a center position of the TK unit 51 to the label suction part 11.

Further, the label suction part 11 is provided for, as also illustrated in FIG. 16, the auxiliary part 4 (or auxiliary part 3) extending sideward from the base part 2 of the TK unit 51.

Accordingly, a distance L12 between the transfer base rotation axis CL51 that is a horizontal-direction center of the TK unit 51 and the center axis CL12 of the pad part 12 is elongated by an extended portion of the auxiliary part 4 compared to a case of arranging the label suction part 11 on the base part 2.

This expands an installable range of the printer 62, to increase the degree of designing freedom of the product transfer apparatus 52. Also, a moving distance of the TK unit 51 to suck the label 62a can further be reduced by a reciprocation portion of the extension of the auxiliary part 4, thereby shortening a label pasting operation time and improving a working efficiency.

The Embodiment 1 of the present invention is not limited to the above-mentioned configurations and sequences and is modifiable without departing from the gist of the present invention.

The label suction part 11 may be modified to a rotation part 111 serving as a label suction part capable of rotating a rod 11b supporting the pad part 12.

The rotation part 111 will be explained with reference to FIG. 17.

The rotation part 111 has a motor 11c1 that is fixed to the auxiliary part 4 in a state that an output shaft 11c2 is downwardly oriented. The motor 11c1 is a motor such as a step motor whose rotation angle is controllable.

At a front end of the output shaft 11c2 of the motor 11c1, there is arranged a holder 11c3 to which an upper part of the air cylinder 11a is fixed. Operation of the motor 11c1 is controlled by the control device 54.

With this configuration, rotating the motor 11c1 results in rotating the air cylinder 11a and pad part 12 around the axis CL11 (an arrow DRq). In connection with this, the axis CL11 is hereunder called a label suction rotation axis CL11.

With this, the orientation of the label 62a sucked by the label pad part 14 can optionally be changed without turning the TK unit 51 around the transfer base rotation axis CL51. Namely, installing the rotation part 111 enables the label 62a to be pasted on the product WP in an optional orientation without turning the TK unit 51.

In a state that the rod 11b is not positioned on the lower end side of an up-down stroke, if the pad part 12 is turned, there will be a case that it interferes with the suction units 5 of the auxiliary part 4.

For this, the control device 54 executes the rotation of the motor 11c1 only when the rod 11b is positioned at the lowermost end or at the lower end side not interfering with the suction units 5.

Also, when lifting the rod 11b, the control device 54 turns and orients the base plate 13 in a direction in which the base plate 13 extends away from the transfer base rotation axis CL51 not to interfere with the suction units 5, and then, lifts the rod 11b.

The base plate 13 may be lengthy so that, when the label pad part 14 is turned, it is positioned at a center position of the base part 2 or at a position crossing the transfer base rotation axis CL51.

Concrete pasting examples of the label 62a using the rotation part 111 will be explained with reference to FIGS. 18(a) to 18(e).

FIG. 18(a) is a partial plan view illustrating a skeleton WS and product WP placed on the work pallet 31 and FIGS. 18(b) to (e) are enlarged views of a part A of FIG. 18(a), i.e., a protruding corner part of the product WP.

Figure 17:
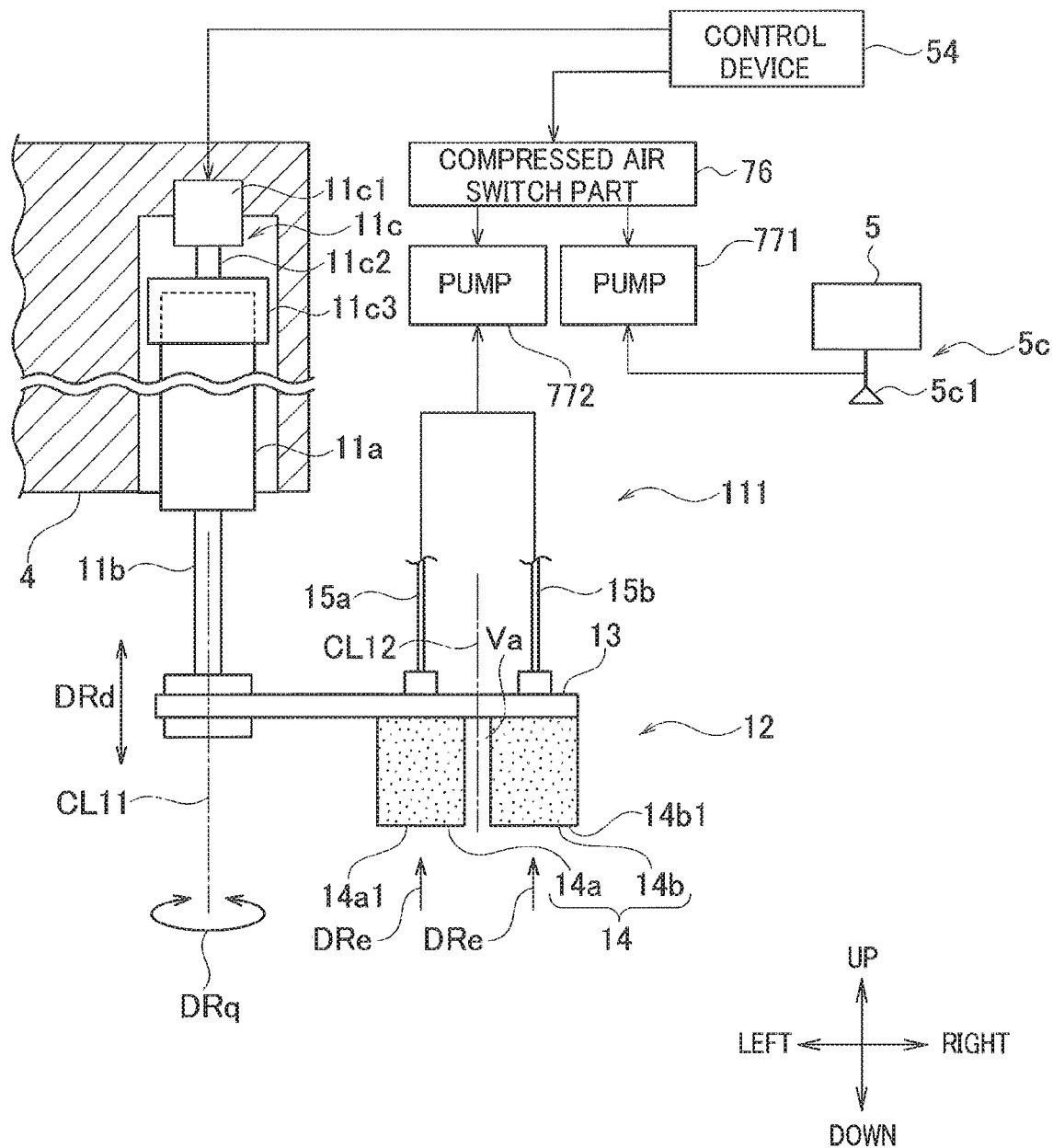
FIG. 17 is a side view illustrating a rotation part 111 that is a modification of the label suction part 11.
Figure 18:
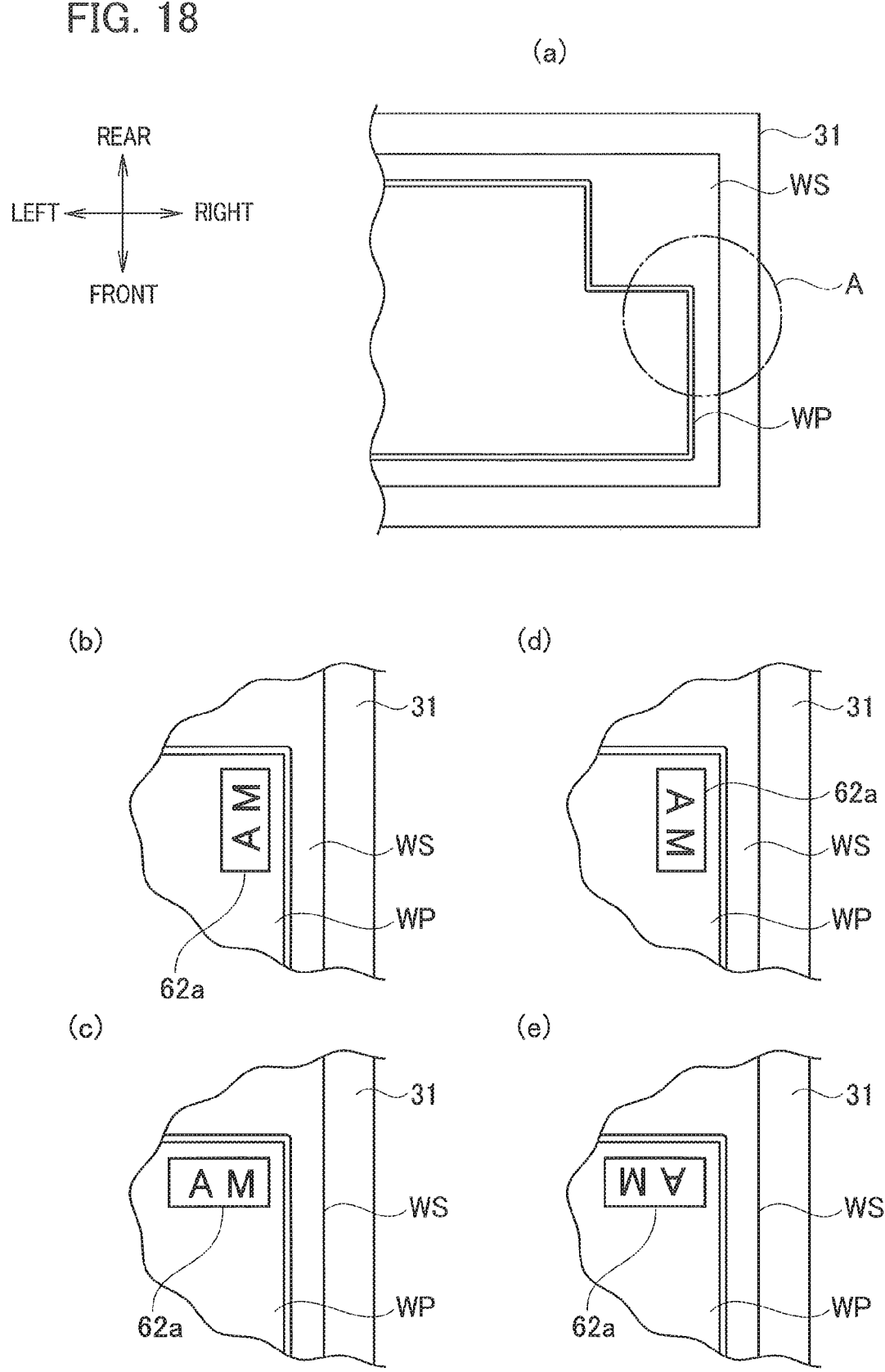
FIG. 18 is a view illustrating pasted examples of a label 62a by the rotation part 111.
Figure 19:
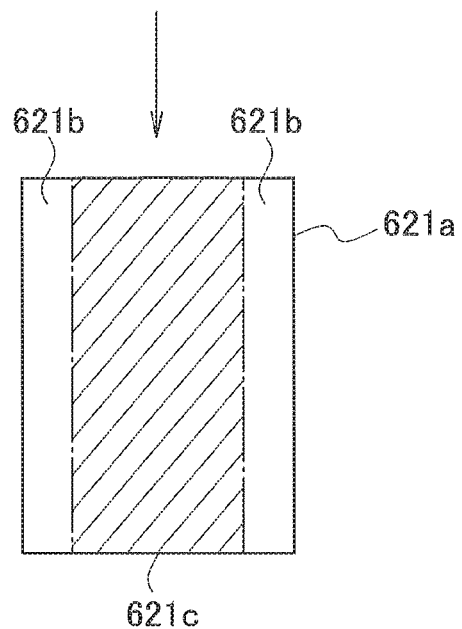
Figure 19:
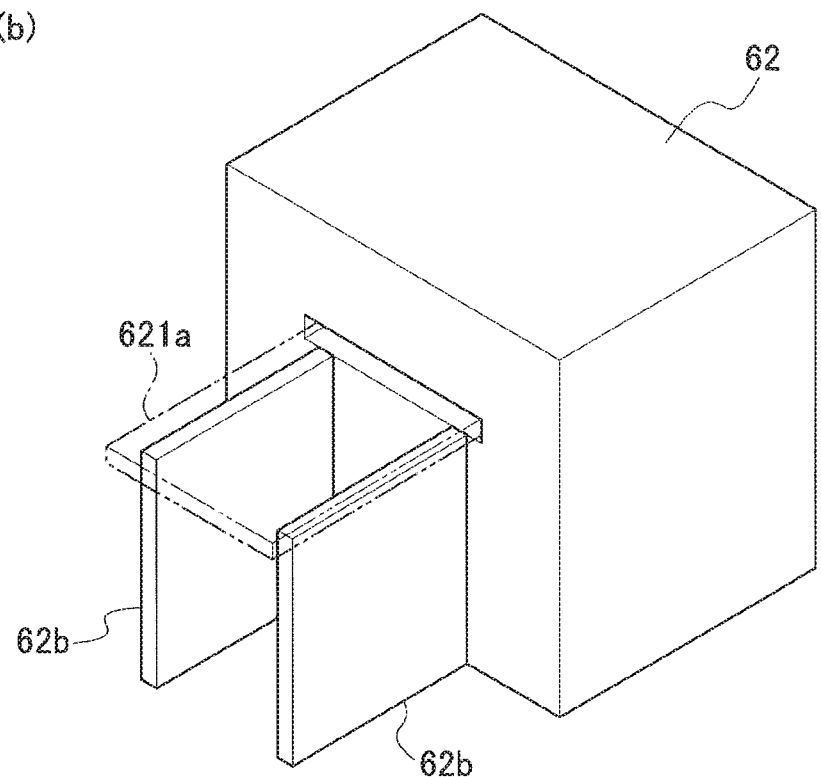

FIG. 18(b) illustrates a case that the label 62a is pasted when the label pad part 14 is at a base position as illustrated in FIG. 17 where the label pad part 14 is on the right side of the label suction rotation axis CL11. In this case, printed characters "AM" on the label 62a are erect when seen from the right of the product WP.

FIGS. 18(c) to (e) illustrate cases that the motor 11c1 is clockwise rotated in a top view by 90 degree, 180 degree, and 270 degrees, respectively, and the label 62a is pasted.

In FIGS. 18(c) to (e), the label 62a is oriented such that the printed characters "AM" are erect when seen from the front, left, and rear, respectively, of the product WP.

According to a rotation angle of the motor 11c1, it is easily possible to paste the label 62a in a direction slanted with respect to the front-rear or left-right direction.

As illustrated in FIGS. 18(b) to (e), in the case of pasting the label 62a to the same position in different orientations, the TK unit 51 must horizontally be moved according to an eccentric distance between the label suction rotation axis CL1 and the center axis CL12. However, the moving distance is small compared to the whole dimensions of the TK unit 51 and no rotation is involved in the movement, so that there is substantially no influence on a working efficiency.

The pad part 12 of the label suction part 11 is preferable to be replaceable with respect to the rod 11b. This makes it possible to use the label pad part 14 having a size and shape optimized for the size and shape of the label 62a, thereby realizing a surer pasting operation and a higher pasting quality.

The label pads 14a and 14b are not limited to cuboids if the bottom faces 14a1 and 14b1 are flat. For example, the label pads 14a and 14b may have a truncated conical shape with a flat bottom face through which air holes are formed. The number of the air holes is not limited and is preferably plural.

The TK unit 51 may be provided with a plurality of label suction parts 11. For example, the printer 62 is configured to sequentially push out labels 62a3 and 62a4 corresponding to two products WP1 and WP2, and after the two label suction parts 11 suck the labels 62a3 and 62a4, respectively, a pasting operation to the products WP1 and WP2 is conducted.

This eliminates the necessity of reciprocating the TK unit 51 two times between the products WP1 and WP2, and in practice, only one time of reciprocation is needed. Accordingly, label pasting operation for a plurality of locations can efficiently be carried out.

The label 62a is modifiable to a label 621a illustrated in FIG. 19(a). FIG. 19(a) is a view seen from a bottom face (adhesive face) of the label 621a.

Of the label 621a, a face with an adhesive layer that becomes a bottom face when discharged has a pair of edge parts in a width direction (a direction orthogonal to a discharge direction indicated with an arrow), the edge parts extending in the discharge direction to form non-adhesive parts 621b having no adhesive layers. Namely, the label 621a has, on the bottom face thereof, an adhesive part 621c in a hatched widthwise center portion and the pair of non-adhesive parts 621b that widthwise sandwich the adhesive part 621c.

On the other hand, as illustrated in FIG. 19(b), the printer 62 is equipped with, when using the label 621a, a pair of support tools 62b at positions corresponding to the non-adhesive parts 621b of the discharged label 621a, to support from below a horizontal state of the label 621a.

With this, the label 621a discharged without a release paper to a predetermined protrusion length is substantially horizontally supported with the pair of support tools 62b. Accordingly, there is no need of blowing air from below to maintain the horizontal state. Namely, a standby state until suction is stabilized.

The label 62a for the printer 62 is not limited to the above-mentioned half-cut one in which a release paper is left from a roll. The label 62a may be, for example, one that is in a roll together with a release paper when printed. In this case, the printer 62 is provided with a built-in cutter, and when the label pad part 14 conducts suction and transfer, the label is separated from the release paper and is cut and separated with the built-in cutter of the printer 62.

Further, the product WP is not limited to one cut out of a plate-like raw material. The product means a plate-like member without regard to a preceding process or a processing type.

Embodiment 2

A general configuration of the laser processing system STA including the product transfer apparatus 52A of the Embodiment 2 will be explained.

The laser processing system STA is one that replaces the TK unit 51 with a TK unit 51A and an external configuration thereof is substantially the same as the laser processing system ST illustrated in FIG. 1. In FIG. 1, marks 51A, 52A, and STA are added with parentheses.

As illustrated in FIG. 20, the TK unit 51A, compared to the TK unit 51, deletes the label suction part 11 provided for the auxiliary part 4 and arranges a label suction part 21 on a base part 2A. Also, as illustrated in FIG. 22, the CPU 54d in the control device 54 has a rotation cylinder control part 54a for controlling operation of a rotation cylinder 211 (refer to FIG. 21) provided for the label suction part 21.

Accordingly, the laser processing system ST of the Embodiment 1 and the laser processing system STA of the Embodiment 2 have the same configuration and executable operation except for the label suction part 11 and label suction part 21.

The label suction part 21 arranged on the base part 2A will be explained with reference to FIGS. 20 to 24.

Figure 21:
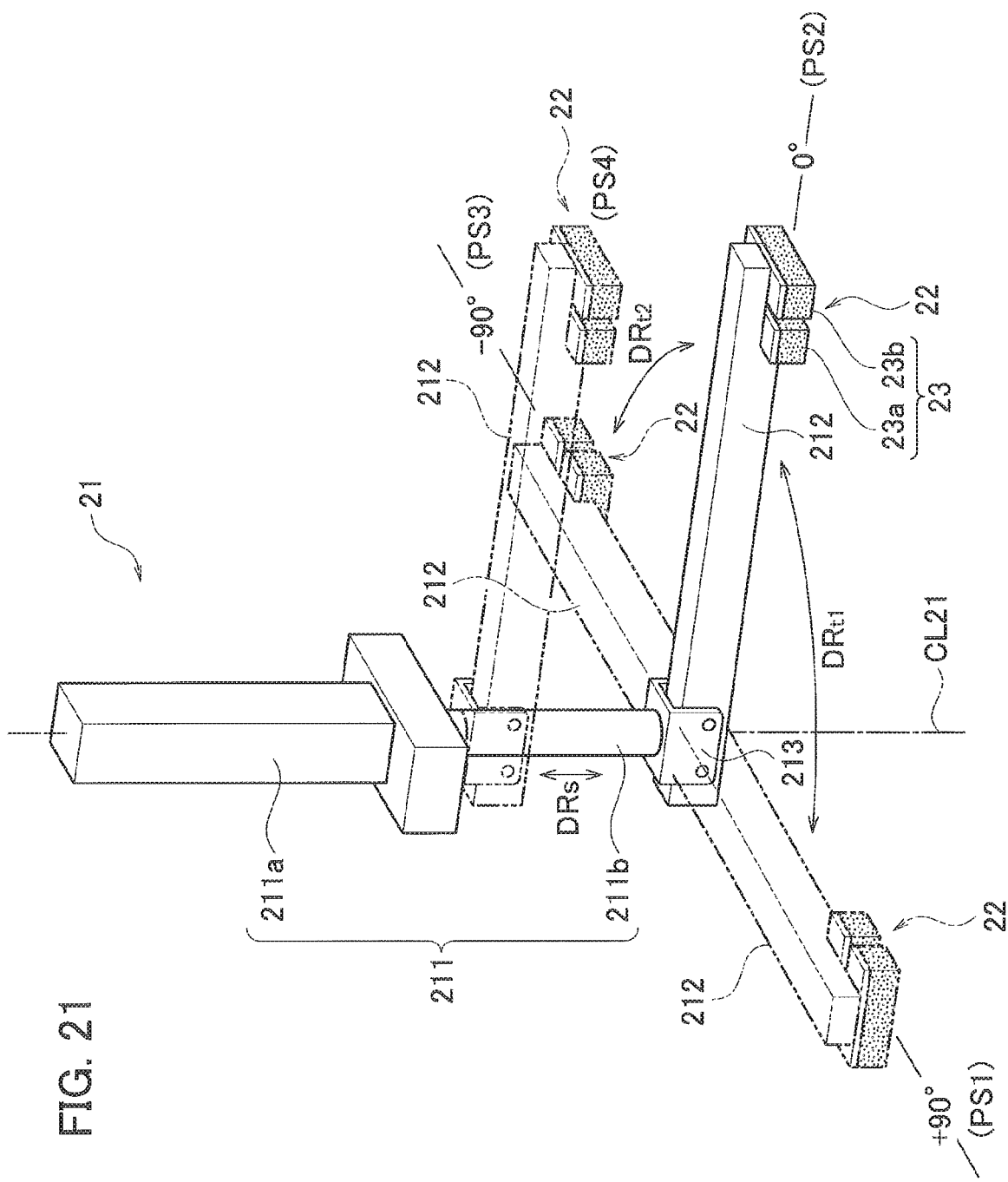
FIG. 21 is a perspective view explaining operation of a label suction part 21 provided for the TK unit 51A.
Figure 22:
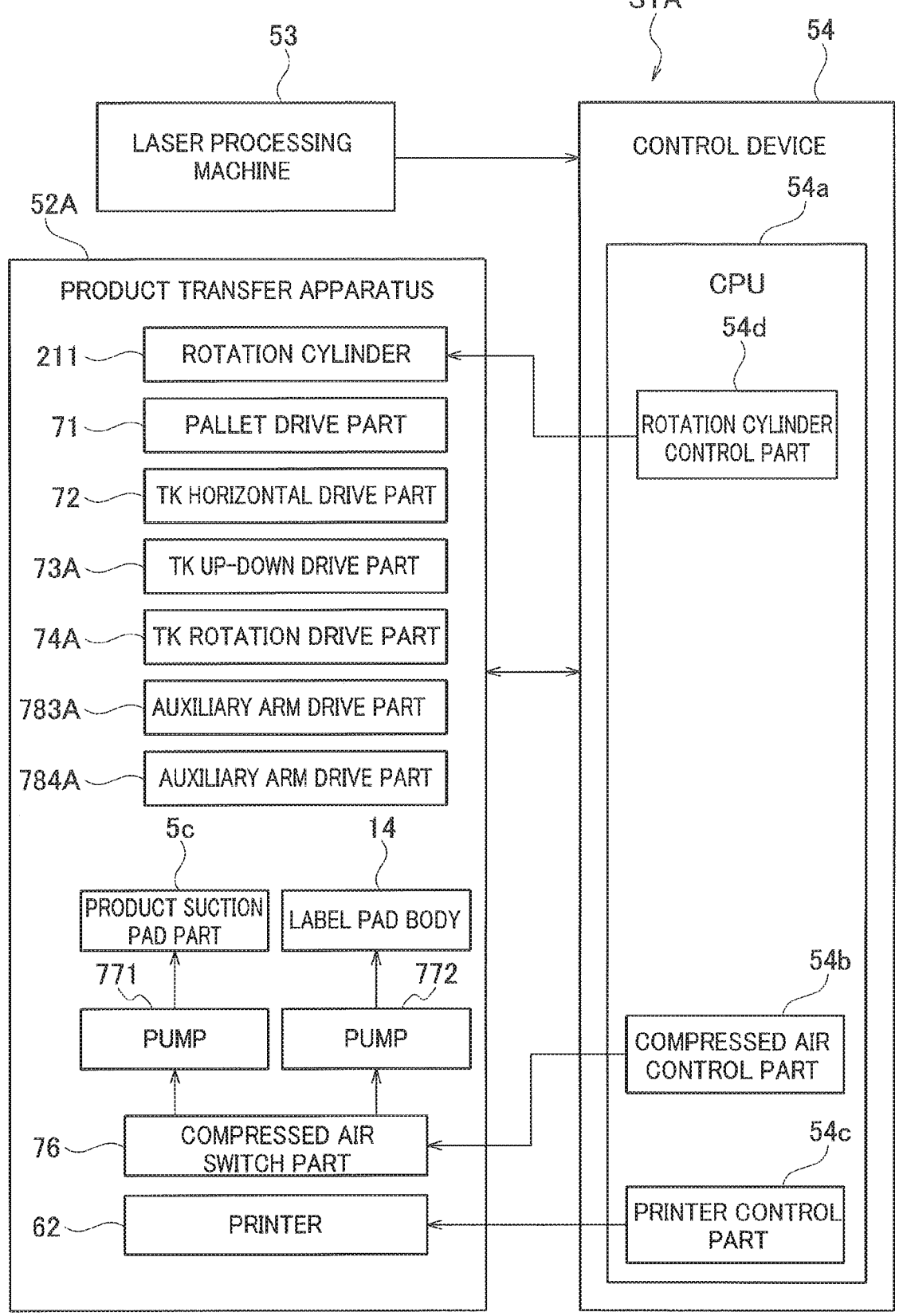
FIG. 22 is a block diagram illustrating a configuration of a laser processing system STA provided with a product transfer apparatus 52A according to the Embodiment 2.
Figure 23:
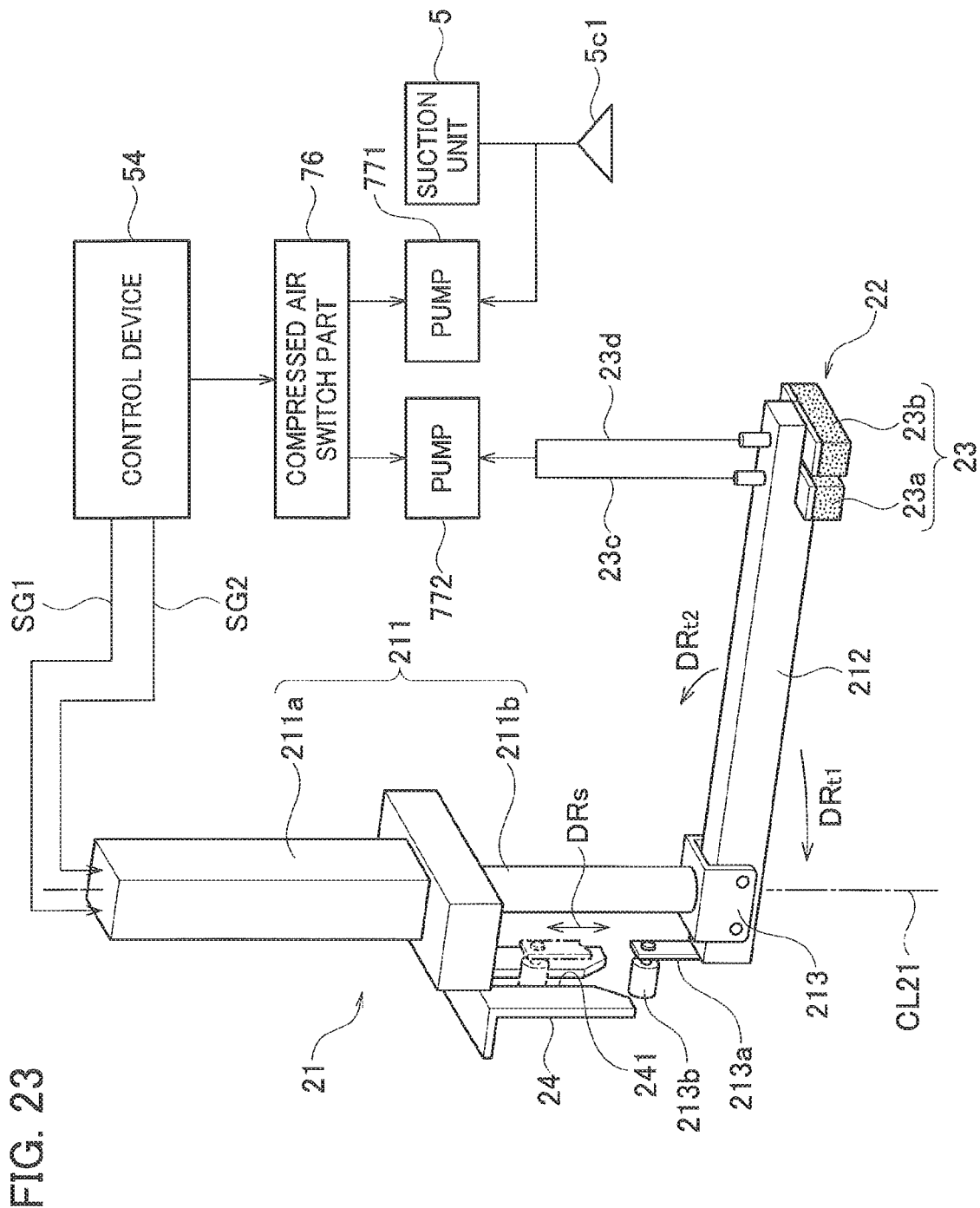
FIG. 23 is a block diagram explaining operation control of the label suction part 21.

FIG. 20 is a perspective view of the TK unit 51A, FIG. 21 a perspective view explaining operation of the label suction part 21, and FIGS. 22 and 23 are a functional block diagram of the laser processing system STA as a whole, explaining operational control of the label suction part 21 and a block diagram related to the label suction part 21. FIG. 24(a) is a front view of a product suction part 51aA provided for the TK unit 51A and FIG. 24(b) a bottom view of the product suction part 51aA.

As illustrated in FIGS. 20 and 21, the TK unit 51A has a TK up-down drive part 73A, a body part 1A, and the product suction part 51aA as a transfer base.

The TK up-down drive part 73A has a servomotor (not illustrated) and is installed on the movable frame 52j. The body part 1A is supported to move up and down relative to the movable frame 52j with the servomotor of the TK up-down drive part 73A serving as a drive source. The product suction part 51aA is attached to a lower part of the body part 1A.

The product suction part 51aA rotates (refer to an arrow DR1A), by operation of a TK rotation drive part 74A, with respect to the body part 1A around a transfer base rotation axis CL51A extending vertically. A rotation range is, for example, 180 degrees in each of clockwise and counterclockwise directions, i.e., 360 degrees in total from a state illustrated in FIG. 20.

The product suction part 51aA, i.e., the transfer base is provided with a base part 2A and a pair of auxiliary parts 3A and 4A. When a top-viewed shape of the product suction part 51aA is substantially symmetrical, the transfer base rotation axis CL51A is set to pass through a center position of the product suction part 51aA.

The base part 2A is formed substantially in a hexahedral shape.

The pair of auxiliary parts 3A and 4A are supported at front ends of support arm parts 3aA and 4aA that move into and out of the left and right of the base part 2A by operation of auxiliary arm drive parts 783A and 784A, respectively.

According to operation of the auxiliary arm drive parts 783A and 784A, the auxiliary parts 3A and 4A move between base positions closely attached to the base part 2A and extended positions protruding leftward and rightward (refer to arrows DRc).

Namely, the auxiliary parts 3A and 4A horizontally move toward and away from the transfer base rotation axis CL51A.

In FIG. 20, the auxiliary parts 3A and 4A at the base positions are depicted with continuous lines and the auxiliary parts 3A and 4A at the extended positions with chain lines.

Figure 24:
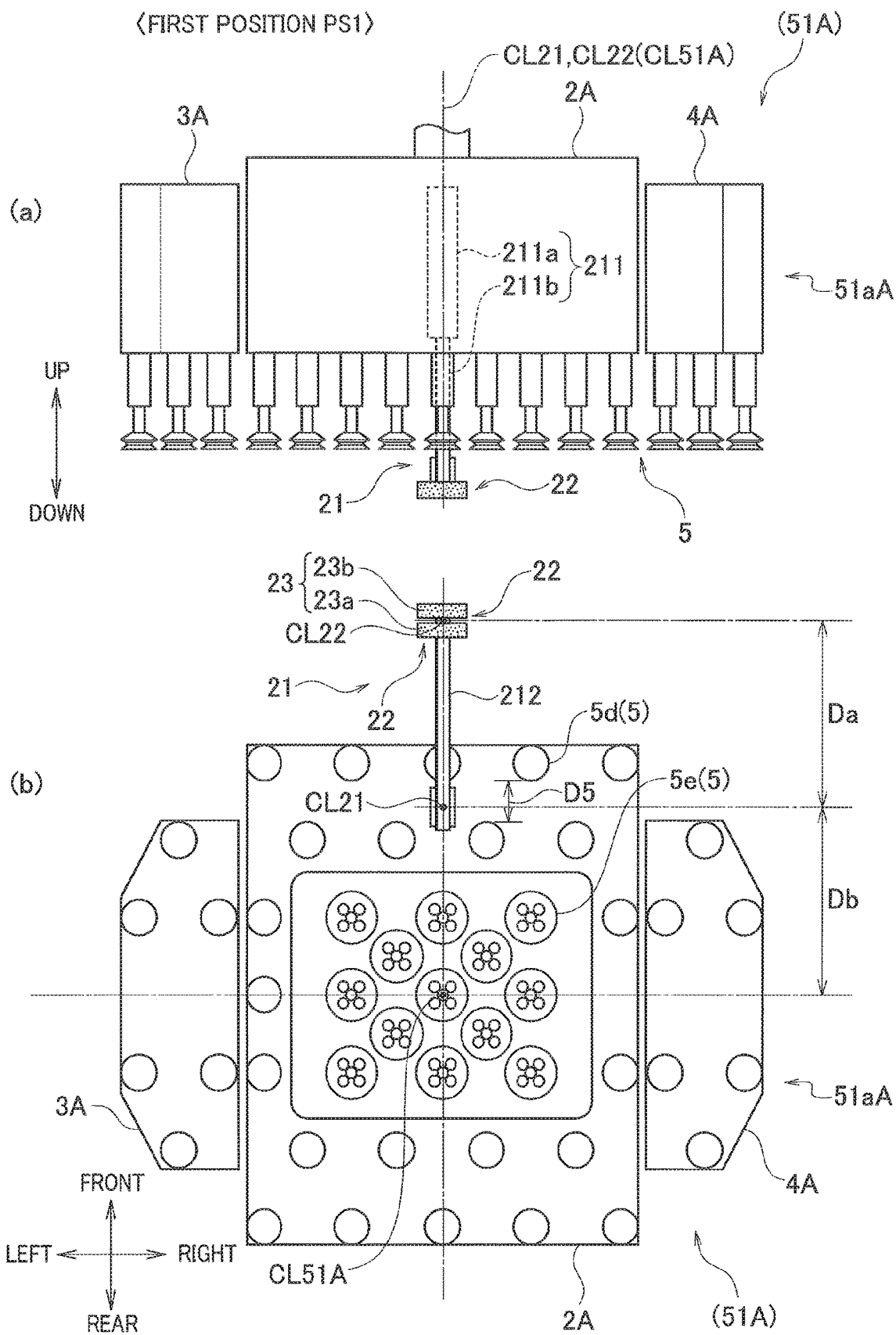
FIG. 24 illustrates a first position PS1 of an arm 212 on a product suction part 51aA, in which (a) is a front view and (b) a bottom view.

As illustrated in FIGS. 20 and 24, at lower parts of the base part 2A and auxiliary parts 3A and 4A, a plurality of suction units 5 that are the same as those of the Embodiment 1 are arranged along vertical axes.

Employed as the suction units 5 are suction units 5d and suction units 5e that have stronger suction force than the suction units 5d.

More precisely, as illustrated in FIG. 24, in a central range of the base part 2A, a plurality of the suction units 5e of stronger suction force are arranged in a dense zigzag array. And, in a frame-like peripheral range surrounding the central range, a plurality of the suction units 5d having lower suction force than the suction units 5e are arranged in a zigzag array coarser than that of the suction units 5e.

A front-rear-direction arrangement interval D5 (refer to FIG. 24(b)) of the suction units 5d is set to allow a straight arm 212 to enter without interfering with the suction units 5d.

A lower part of each suction unit 5 is provided with a product suction pad part 5c. As illustrated in FIGS. 22 and 23, the product suction pad parts 5c are connected to the pump 771 for generating a negative pressure and operation of the pump 771 is controlled by the compressed air switch part 76.

At a lower front end of the product suction pad part 5c, there is provided a rubber suction cup part 5c1 formed like the peripheral face of a truncated cone. With this, according to operation of the pump 771, the inside of the suction cup parts 5c1 can be set to a negative pressure to suck a flat plate member such as the product WP. Operation of the pump 771 is directly controlled by the compressed air switch part 76 and the compressed air switch part 76 is controlled by the control device 54.

As illustrated in FIGS. 21 and 24, the label suction part 21 has a rotation cylinder 211 having a body part 211a and rod 211b, the arm 212, and a pad part 22.

The body part 211a is fixed to the base part 2A in a state that a rotation axis CL21 is in parallel with the transfer base ration axis CL51A. The rod 211b moves up and down along the rotation axis CL21 for a predetermined stroke and rotates in an angular range of 180 degrees.

At a front end of the rod 211b, the arm 212 is attached through a connection holder 213. The arm 212 is attached to the rod 211b in a state to extend in a direction orthogonal to the rotation axis CL21.

The arm 212 is straightly formed to extend in a diameter direction with the rotation axis CL21 being a center. At a front end part of the arm 212, there is attached a pad part 22. The pad part 22 is configured similar to the pad part 12 of the Embodiment 1.

Namely, the pad part 22 has a label pad part 23 that is a combination of label pads 23a and 23b. The label pads 23a and 23b are a group of the same material. In FIG. 20, each of them is formed as a cuboid sponge body elongating in the left-right direction. The material thereof is, for example, a chloroprene rubber sponge body. Accordingly, the label pads 23a and 23b have elasticity at least in the up-down direction.

The label pads 23a and 23b have a plurality of vertically passing air holes (not illustrated) and the air holes are connected to, as illustrated in FIG. 23, hoses 23c and 23d passed through the arm 212 and pulled out of a top face of the arm 212. In FIG. 23, the hoses 23c and 23d are connected to the pump 772 for generating a negative pressure.

To the compressed air switch part 76, as already mentioned, the pumps 771 and 772 are connected. The compressed air switch part 76 executes operation control under the control of the control device 54 with respect to the pumps 771 and 772 such that air suction is carried out by the product suction pad parts 5c of the suction units 5, or by the label pad part 23 of the label suction part 21, or by the both.

Under the control of the compressed air switch part 76, if the pump 772 is operated to apply a negative pressure to the label pad part 23 of the label suction part 21, the air holes (not illustrated) of the respective bottom faces of the label pads 23a and 23b draw air. With this, the bottom faces of the label pad part 23 can suck the label 62a.

On the other hand, under the control of the compressed air switch part 76, if the negative pressure path is connected to the product suction pad parts 5c of the suction units 5, the suction cup parts 5c1 draw air. With this, the product suction pad parts 5c can suck the product WP.

The arm 212 having at the front end thereof the label pad part 23 rotates, by operation of the rotation cylinder 211, at a rotation angle of 180 degrees. The arm 212 illustrated in FIG. 20 is at a right end position seen from the top of the rotation angle range.

The rotation cylinder 211 incorporates, for example, a servomotor and operates under the control of the control device 54. More precisely, as illustrated in FIG. 23, the rod 211b responds to a linear motion signal SG1 from the control device 54 to move along the rotation axis CL21 (up-down direction), and in response to a rotation signal SG2, turns around the rotation axis CL21 within a predetermined angular range. In connection with this, the rotation axis CL21 is called a label suction rotation axis CL21.

According to the linear and rotation motions of the rotation cylinder 211, the arm 212 connected to the rod 211b can at least take four positions from a first position PS1 to a fourth position PS4.

FIGS. 24 to 27 illustrate states that the arm 212 are at the first position PS1 to the fourth position PS4, respectively.

At the first position PS1 illustrated in FIG. 24, the arm 212 is at a lowermost position in the up-down motion. In the rotatable range, it is at an endmost position in a counter-clockwise direction in the bottom view of FIG. 24(b). This endmost position is called a first rotation position of the arm 212.

At this time, the arm 212 is positioned entirely lower than the suction units 5 in the up-down direction. Accordingly, even if the rod 211b turns to turn the arm 212, the arm 212 does not interfere with the suction units 5.

Also, at the first position PS1, the position of the label suction rotation axis CL21 of the arm 212 is in front of the transfer base rotation axis CL51A separated by a distance Da. On the arm 212, the label pad part 23 is outside an external shape of the transfer base 51aA and a distance Db that is an arm length between the label suction rotation axis CL21 and a center axis CL22 of the label pad part 23 is equal to the distance Da.

Figure 25:
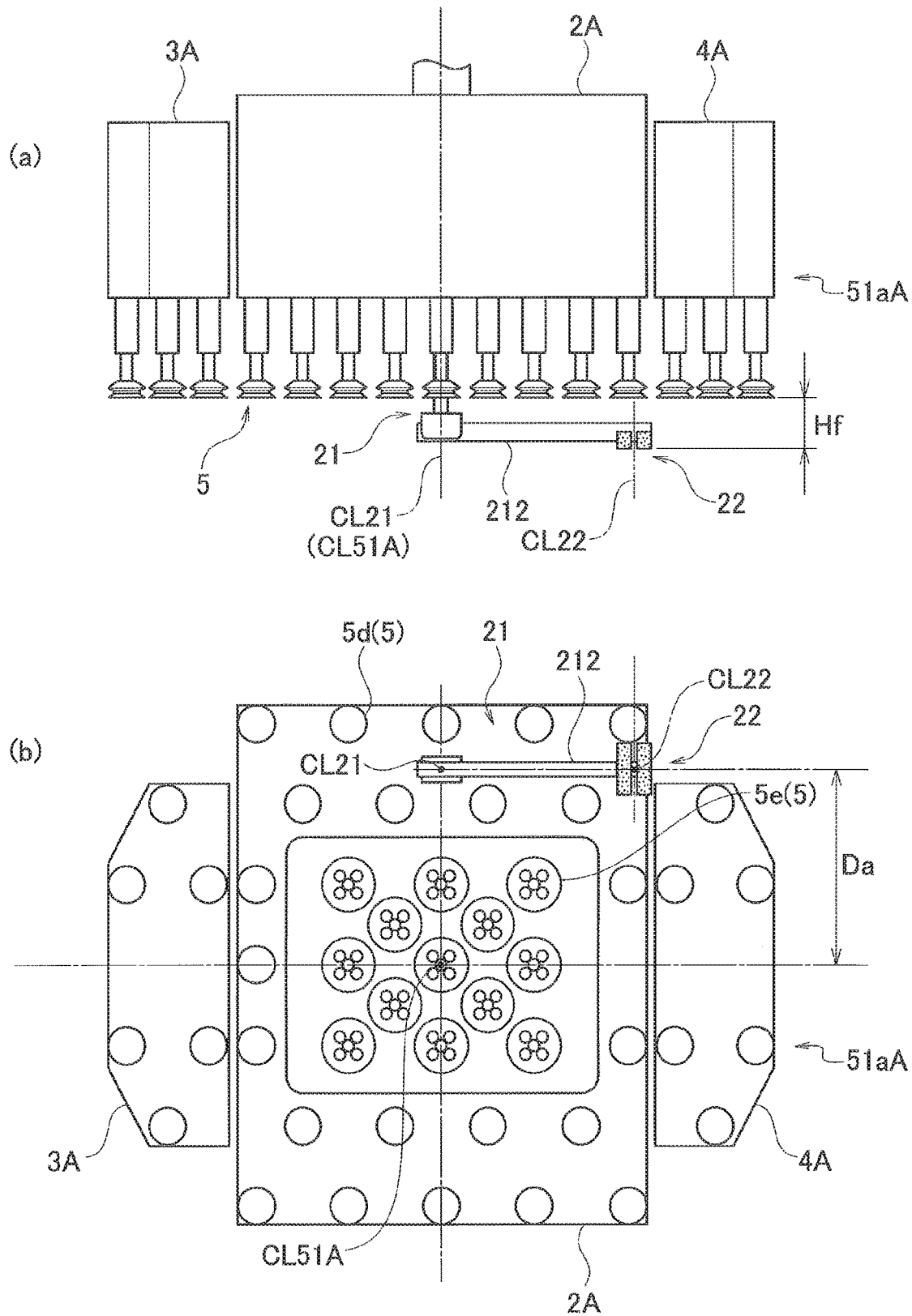
FIG. 25 illustrates a second position PS2 of the arm 212 on the product suction part 51aA, in which (a) is a front view and (b) a bottom view.

At the second position PS2 illustrated in FIG. 25, the arm 212 is, like the first position PS1, at the lowermost position in the up-down motion, and in the rotation range, is at a center position turned by 90 degrees from the first position PS1.

At the third position PS3 illustrated in FIG. 26, the arm 212 is, like the first position PS1 and second position PS2, at the lowermost position in the up-down motion, and in the rotation range, is turned by 180 degrees from the first position SP1 and at an endmost position in a clockwise direction in the bottom view of FIG. 26(b). At the third position PS3, the center axis CL22 of the label pad part 23 is at the same position as the transfer base rotation axis CL51A of the base part 2A. This position is called a second rotation position of the arm 212.

At the fourth position PS4 illustrated in FIG. 27, the arm 212 is at the same position as the second position PS2 in the rotation range and at an uppermost position in the up-down motion. Also, the label pad part 23 is inside the outer shape of the transfer base 51aA.

Further, at the fourth position PS4, the bottom faces of the label pads 23a and 23b are positioned upper by a distance He than the bottom faces of the suction cup parts 5c1 of the suction units 5. The distance He is set such that, when the suction units 5 suck a work W, the label pads 23a and 23b may not be in contact with the work W without regard to deformation of the suction cup parts 5c1.

Figure 28:
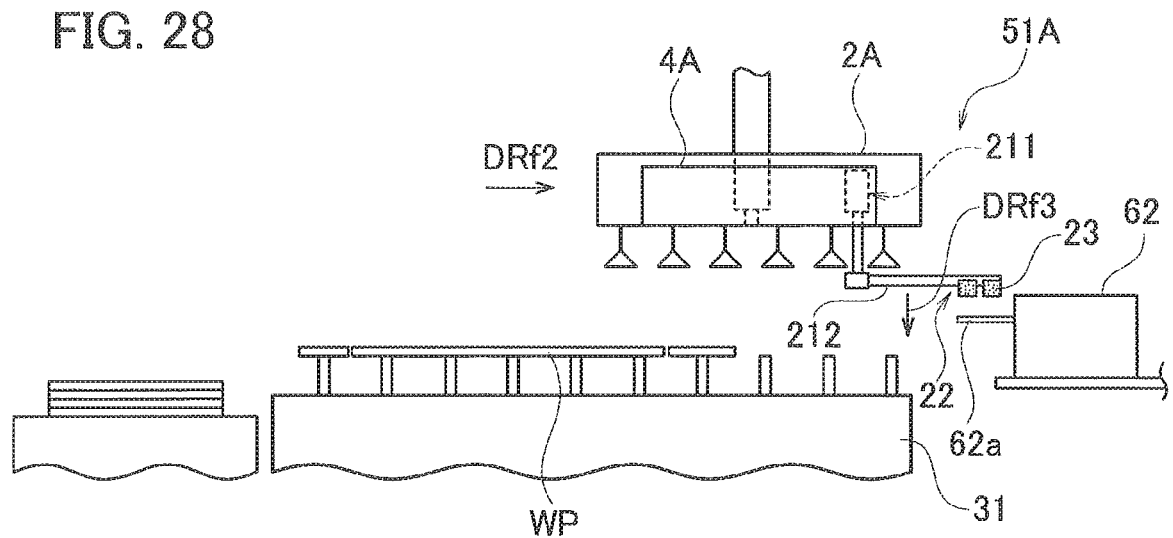
FIG. 28 is a first view explaining a label pasting operation by the TK unit 51A.
Figure 29:
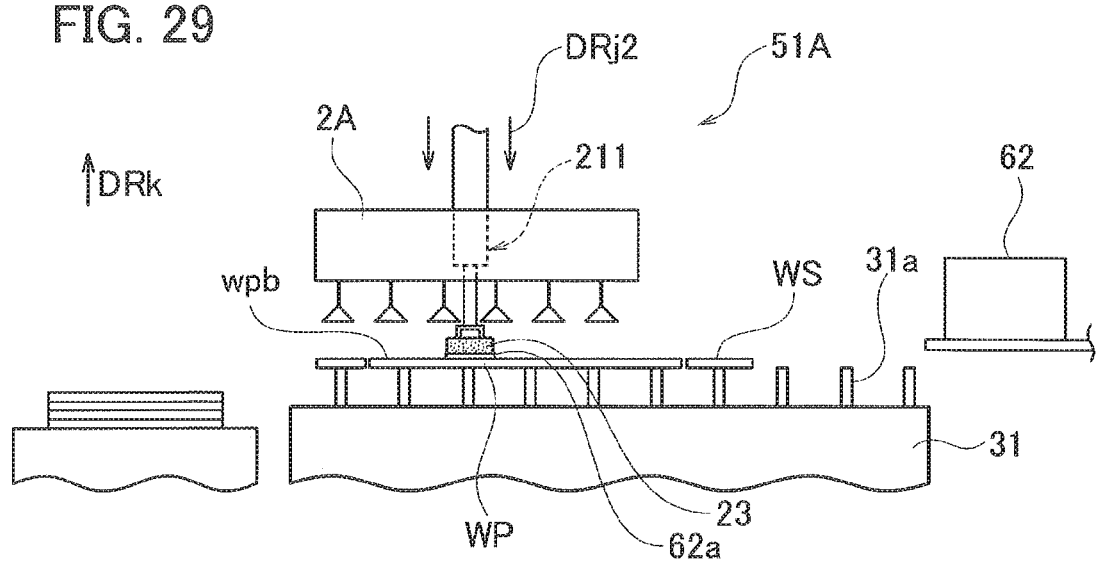
FIG. 29 is a second view explaining the label pasting operation by the TK unit 51A.
Figure 30:
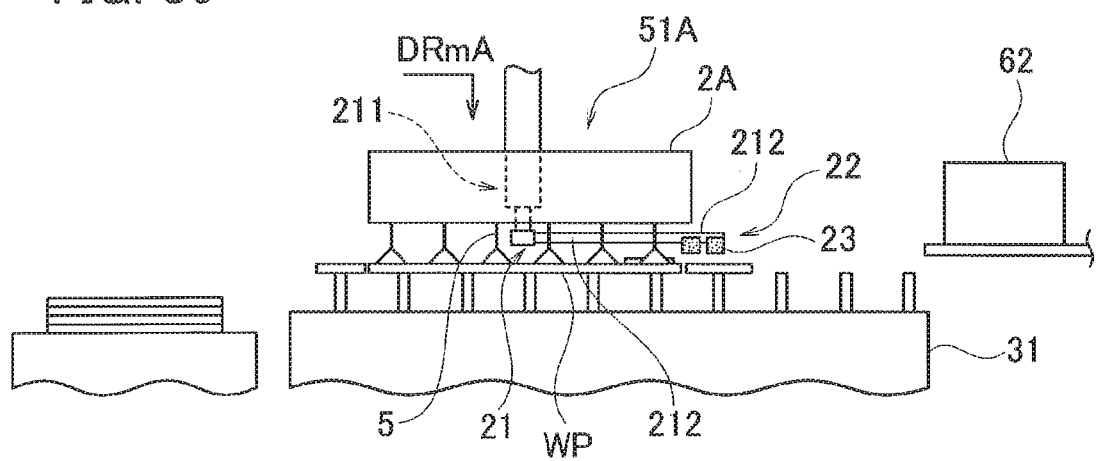
FIG. 30 is a third view explaining the label pasting operation by the TK unit 51A.

A state that the TK unit 51A provided with the label suction part 21 sucks and obtains the label 62a from the printer 62, a state that the TK unit 51A pastes the obtained label 62a to the product WP, and a state that the product WP is sucked by the product suction part 51aA will be explained with reference to FIGS. 28 to 30, respectively. In FIGS. 28 to 30, the control device 54 is not illustrated.

As illustrated in FIG. 28, in an operation of obtaining the label 62a, the control device 54 sets the arm 212 of the TK unit 51A to the first position PS1 and turns the TK unit 51A so that the arm 212 extends in the left-right direction. Next, the TK unit 51A is moved to the vicinity of the printer 62 and the pump 772 is activated to suck and obtain the label 62a.

When the arm 212 is at the first position PS1, the label pad part 23 protrudes outside the base part 2A. Accordingly, a moved distance of the TK unit 51A is small to realize a good moving efficiency.

As illustrated in FIG. 29, in a pasting operation of the label 62a on the product WP, the control device 54 sets the arm 212 to the third position PS3 and turns the TK unit 51A according to a pasting orientation of the label 62a. Also, a pasting position, i.e., a center position of the label 62a to be pasted to the product WP is brought to agree with a center position of the TK unit 51A, i.e., the transfer base rotation axis CL51A. Next, the TK unit 51A is lowered (an arrow DRj2), the pump 772 is stopped while the label 62a is pressed and pasted to the product WP, and the TK unit 51A is lifted.

As illustrated in FIG. 30, in a suction operation of the product WP, the control device 54 brings the arm 212 to the fourth position PS4 through the second position PS2. With this, the label pad part 23 stands by at an upper position without affecting the suction of the product WP.

The control device 54 horizontally moves the TK unit 51A to above a suction position of the product WP, and then, lowers the same (an arrow DRmA). Next, the control device 54 activates the pump 771 to make the suction units 5 to suck and keep the product WP.

After sucking and keeping the product WP, similar to the explanation made in the Embodiment 1 with reference to FIG. 14, the product WP is transferred to a predetermined location.

In this way, the TK unit 51A is an apparatus for transferring the product WP, and also, a label pasting apparatus for pasting the label 62a on the product WP.

Figure 31:
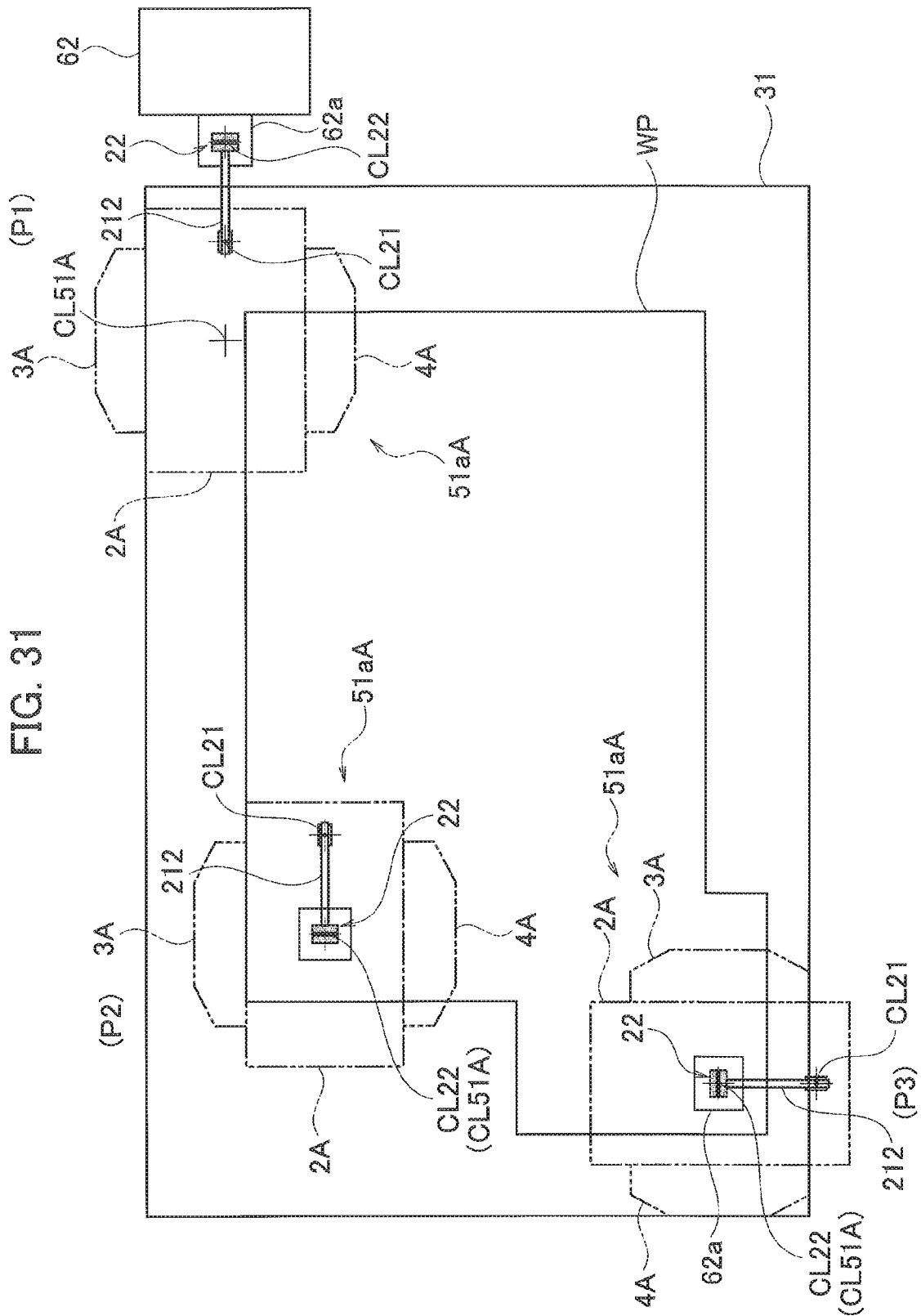
FIG. 31 is a schematic plan view explaining positional examples when obtaining and pasting the label 62a by the TK unit 51A.

FIG. 31 is a schematic plan view explaining positional and attitudinal examples of the product suction part 51aA when the TK unit 51A takes and pastes the label 62a in the laser processing system STA. FIG. 31 illustrates the work pallet 31, a work W placed on the work pallet 31, and the product suction part 51aA.

In FIG. 31, a right upper part (P1) illustrates an example of obtaining the label 62a, a left upper part (P2) a first label pasting example, and a left lower part (P3) a second label pasting example. In the respective examples, external shapes of the base part 2A and auxiliary parts 3A and 4A are depicted with chain lines.

As illustrated in the part (P1) of FIG. 31, when the laser processing system STA causes the TK unit 51A to obtain the label 62a from the printer 62, the arm 212 is brought to the first position PS1 so that the label is obtained with the label suction part 21 positioned away from the base part 2A.

With this, even if the printer 62 is installed at a position away from the work pallet 31, the label 62a is obtainable with the position of the transfer base rotation axis CL51A, i.e., the center of the base part 2A kept within a range corresponding to the work pallet 31.

As illustrated in the parts (P2) and (P3), the center of a pasting position of the label 62a agrees with the transfer base rotation axis CL51A of the base part 2A of the TK unit 51A. Accordingly, the label 62a to be pasted can optionally be oriented by turning the base part 2A.

For example, the label pasting orientation of the label 62a in the part (P2) is a 180-degree-turned orientation with respect to the orientation in which the label is obtained from the printer 62 and the label pasting orientation of the label 62a in the part (P3) is a 90-degree-counterclockwise-turned orientation with respect to the orientation in which the label is obtained from the printer 62.

In this way, the laser processing system STA of the Embodiment 2 is not required to, when pasting the label 62a to the same position in a different orientation, horizontally move the TK unit 51A but is needed only to turn the base part 2A at the same position. Accordingly, a pasting operation in an optional orientation of the label 62a can be carried out at a high efficiency.

Also, in the pasting operation of the label 62a, the center position of the TK unit 51A is moved only within a range corresponding to the work pallet 31. Therefore, a moving time is short, and in this point also, the pasting work can be carried out at a high efficiency.

In the TK unit 51 explained in the Embodiment 1, the distance L12 between the position of the rotation axis CL51 at the center of the base part 2 and the center axis CL12 of the pad part 12 is not 0 (zero) but is variable depending on a movement of the auxiliary part 4 toward and away from the base part 2.

Due to this, the Embodiment 1 specifies, in a program controlling the operation of the TK unit 51, coordinates of two positions, i.e., a center position for sucking and keeping the product WP and a center position for pasting the label 62a, among which the coordinates of the pasting position of the label 62a must be specified by always reflecting a distance between the auxiliary part 4 and the base part 2.

On the other hand, the TK unit 51A of the Embodiment 2 is 0 (zero) in the distance between the position of the transfer base rotation axis CL51A, i.e., the center of the base part 2A and the center axis CL22 of the pad part 22 and this distance is unchanged even if the auxiliary part 4A is moved toward or away from the base part 2A.

As a result, the program can specify the coordinates of a center position for sucking and keeping the product WP and the coordinates of a center position for pasting the label 62a by making them agree with each other. This results in simplifying the program and reducing program errors.

The Embodiment 2 of the present invention is not limited to the above-mentioned configurations and sequences but is modifiable without departing from the gist of the present invention.

Figure 32:
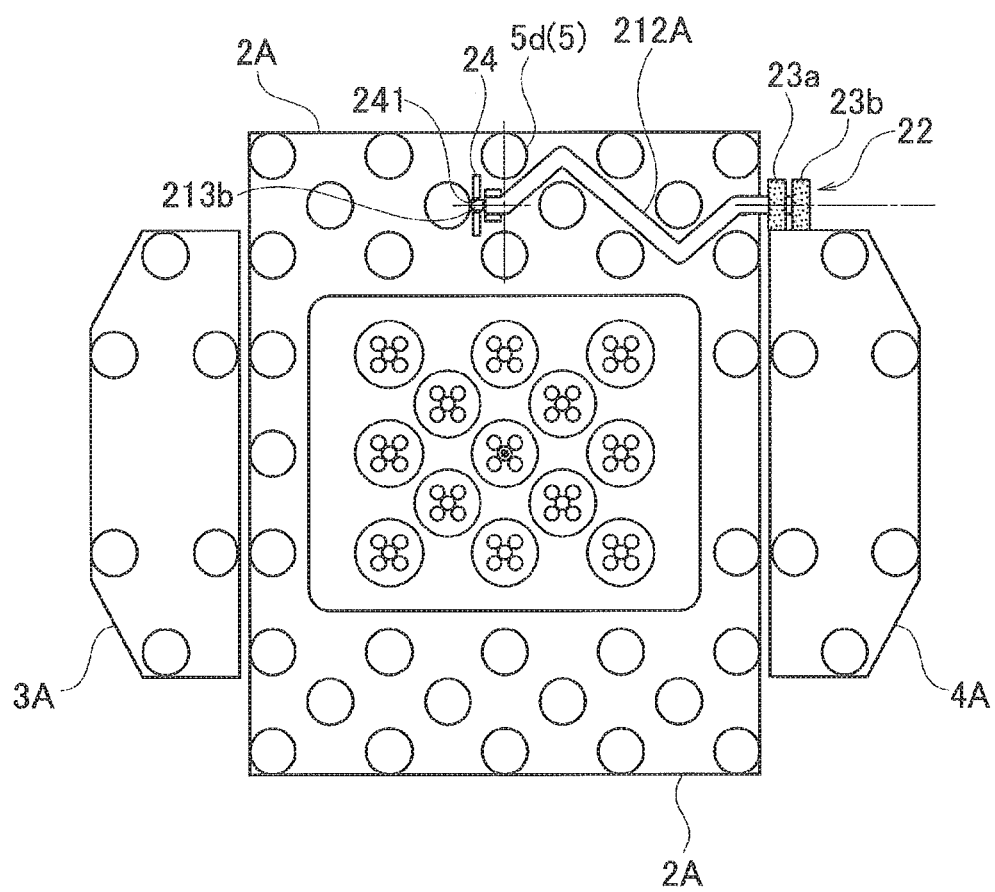
FIG. 32 is a bottom view illustrating an arm 212A that is a modification of the arm 212.

The arm 212 may be not straight. For example, as illustrated in FIG. 32, the suction units 5d among the suction units 5 on the base part 2A are densely arranged in a zigzag array so that the straight arm 212 at the fourth position PS4 is unable to be retracted between the suction units 5d. In this case, an arm 212A of unstraight shape is employable. In FIG. 32, the arm 212A is zigzagged as an example.

The rotation cylinder 211 is not limited to one that is operated by a servomotor. For example, it may be an air cylinder that linearly and rotationally move the rod 211b by air.

Figure 33:
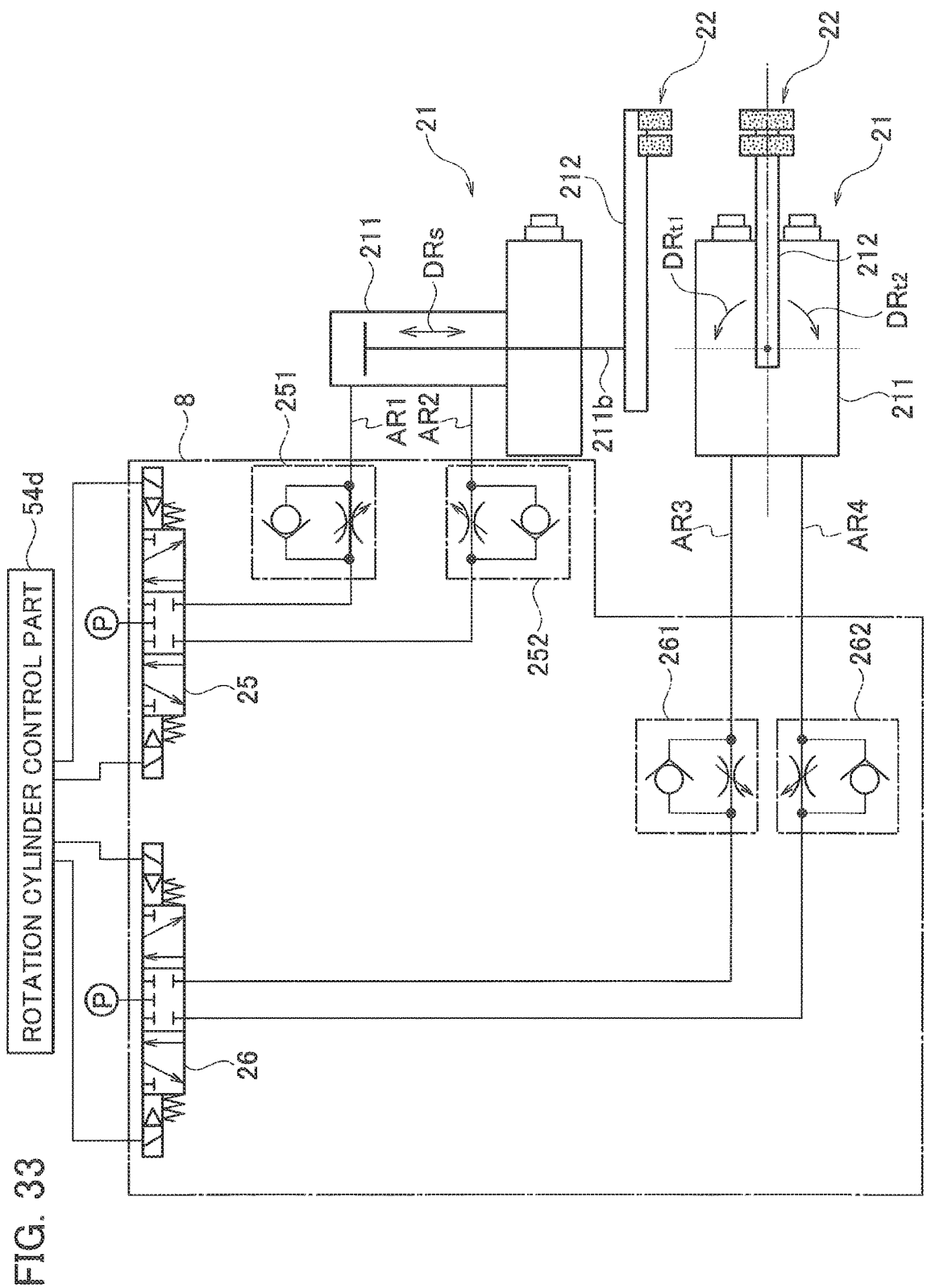
FIG. 33 is an air circuit diagram illustrating an air drive part 8 provided for the laser processing system STA when a rotation cylinder 211 is an air cylinder.

FIG. 33 is a view illustrating an air circuit example when the rotation cylinder 211 is an air cylinder. In this modification, the laser processing system STA is provided with an air drive part 8 for driving the rotation cylinder 211.

The air drive part 8 is constituted by including five-port-type solenoid valves 25 and 26, speed controllers 251, 252, 261, and 262, air paths AR1 and AR2 whose first ends are connected to the solenoid valve 25, and air paths AR3 and AR4 whose first ends are connected to the solenoid valve 26. Operation of the solenoid valves 25 and 26 is controlled by the rotation cylinder control part 54d.

The air path AR1 has the speed controller 251 and a second end connected to an air chamber to lower the rod 211b by air supply. The air path AR2 has the speed controller 252 and a second end connected to an air chamber to lift the rod 211b by air supply.

The air path AR3 has the speed controller 261 and a second end connected to an air chamber to turn the rod 211b in a counterclockwise direction (an arrow DRt1) in FIG. 33 by air supply. The air path AR4 has the speed controller 262 and a second end connected to an air chamber to turn the rod 211b in a clockwise direction (an arrow DRt2) in FIG. 33 by supplying air.

Under the control of the rotation cylinder control part 54d, the solenoid valve 25 selectively supplies air to one of the air paths AR1 and AR2. With this, the rod 211b moves up or down and is kept at a selected one of the end positions of an up-down stroke. Also, under the control of the rotation cylinder control part 54d, the solenoid valve 26 selectively supplies air to one of the air paths AR3 and AR4. With this, the rod 211b rotates and is kept at a selected one of the end positions in the rotation range.

Accordingly, the first position PS1 and third position PS3 of the arm 212 is obtainable only by switching operation of the solenoid valves 25 and 26.

Keeping the arm 212 at the second position PS2 or fourth position PS4, i.e., the center of the rotation range is achieved, for example, as follows. Namely, the speed controllers 261 and 262 are adjusted to adjust air discharge speeds from the air chambers. At the same time, air supply timing of the operation of the solenoid valve 26 is adjusted. With this adjustment, a pressure balance is established between the two air chambers contributing to the rotation so that the arm 212 is kept at the center position of the rotation range.

In this case, it is presumed that a variation of some extent occurs in the rotation position where the arm 212 is kept at. Accordingly, as illustrated in FIG. 23, it is preferable to arrange a guide plate 24 on the base part 2A side and a guide roller 213b on the arm 212 side.

The guide plate 24 has an open inclined part, which is formed at a lower part and is widened to serve as a guide, and a guide slit 241 extended upwardly. The guide roller 213b is attached to a front end of a roller bracket 213a, is engaged with the guide slit 241 substantially without a widthwise gap between them, and is movable up and down.

With this, the guide roller 213b attached to the roller bracket 213a on the arm 212 side is guided by and engaged with, at the fourth position PS4, the guide slit 241 of the guide plate 24. As a result, the rotation position of the arm 212 is firmly fixed and the arm 212 surely enters and retracts between the suction units 5.

Figure 34:
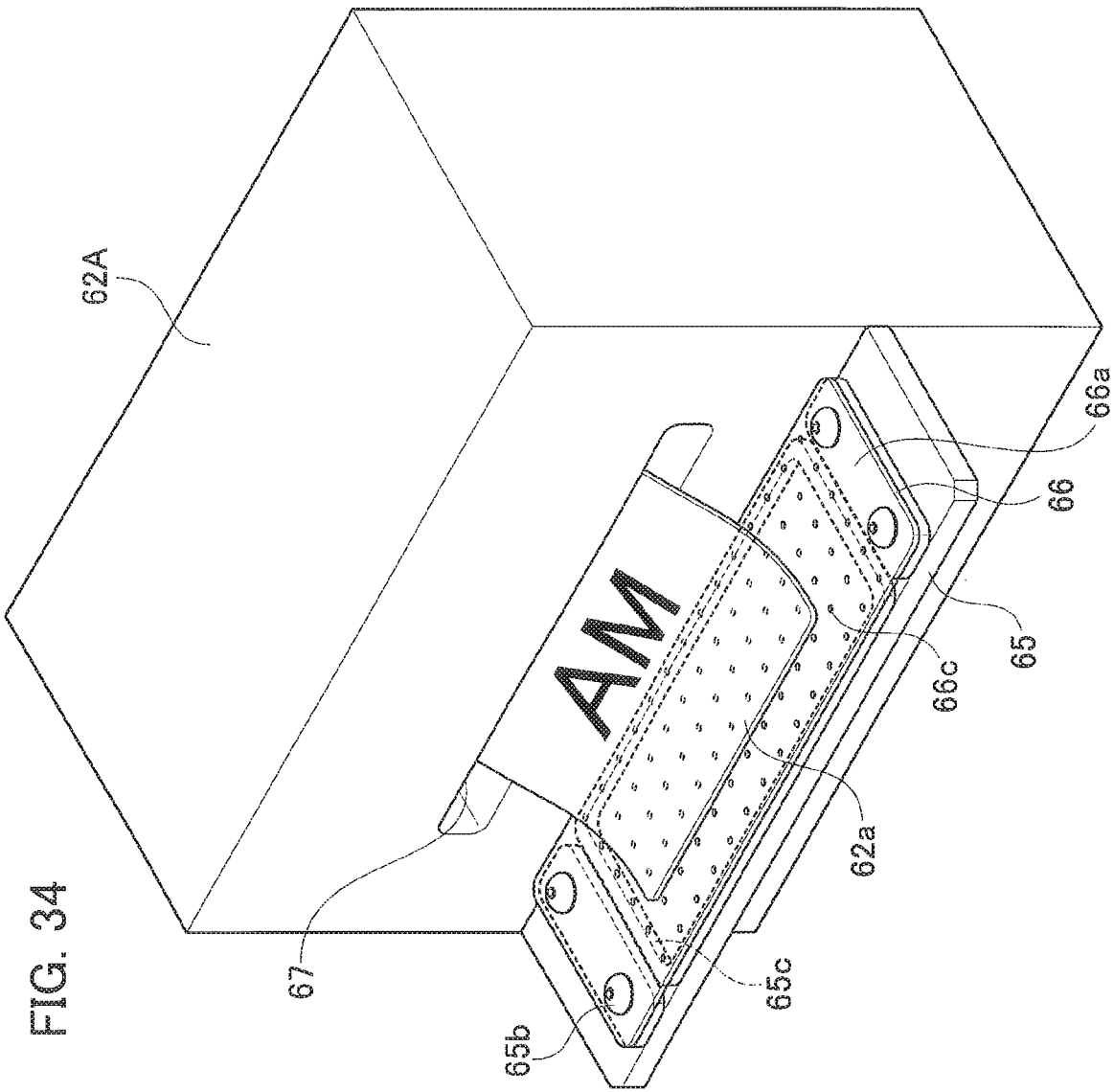
FIG. 34 is a perspective view illustrating a printer 62A that is a modification of the printer 62.

According to the Embodiment 1, Embodiment 2, and their modifications, the printer 62 may be a printer 62A illustrated in FIG. 34. The printer 62A has, as members to receive the label 62a discharged from a discharge port 67, a base plate 65 and a label receiving plate 66.

The base plate 65 has, in a central area, a seal frame part 65c made of, for example, rubber formed in an upwardly protruding frame and through holes (not illustrated) formed in the range of the seal frame part 65c.

The label receiving plate 66 has a top face coating on which the label 62a is placed, and on a bottom face side, a plurality of small-diameter air holes 66c in a range surrounded by the seal frame part 65c when attached to the base plate 65.

The label receiving plate 66 is attached to the base plate 65 with bolts 65b such that the bottom face thereof is closely attached to the seal frame part 65c. In this state, a space surrounded by the seal frame part 65c communicates with the outside only through the through holes of the base plate 65 and the plurality of air holes 66c of the label receiving plate 66.

On the top face of the label receiving plate 66, a non-adhesive layer 66a is formed by coating. This non-adhesive layer 66a has non-adhesiveness with respect to a contacting adhesive.

Namely, the label 62a is simply placed on the label receiving plate 66 with an adhesive thereof not adhering to the label receiving plate 66. Accordingly, the label 62a placed on the label receiving plate 66 can easily be sucked and moved by the label pad part 23.

Here, the coating means a process of laminating, on a substrate, a carbide-based sprayed film and a silicon resin film one on another in this order, or a surface layer formed by such a process.

When the printer 62A discharges the label 62a, the label 62a slides on the label receiving plate 66. At this moment, air is supplied from the outside through the through holes of the base plate 65 into the seal frame part 65c. This air upwardly blows through the air holes 66c of the label receiving plate 66, to slightly raise the label 62a during the discharge.

With this, a front end part of the label 62a during the discharge hardly rubs the label receiving plate 66. As a result, the coating is hardly peeled off, to maintain the non-adhesiveness of the label receiving plate 66 for a long time.

The product transfer apparatus 52A with the above-mentioned configuration sucks the product WP with the product suction pad parts 5c of the suction units 5 and moves the product WP by moving the TK unit 51 to an optional position.

Also, the product transfer apparatus 52A sucks and keeps, with the label suction part 21, the label 62a pushed and exposed out of the printer 62. The label 62a can be pasted to an optional position of the top face WPb of the product WP according to the horizontal, up/down, and rotation movements of the TK unit 51A and the up/down and rotation movements of the arm 212 of the label suction part 21. Further, the product transfer apparatus 52A is easily able to paste the label 62a on the top face WPb in an optional orientation with the transfer base rotation axis CL51A of the TK unit 51A as a pasting center position.

At the second rotation position of the arm 212, the label pad part 23 is at a lower center position of the base part 2A of the transfer base 51aA or a position crossing the transfer base rotation axis CL51A under the base part 2A.

The transfer base rotation axis CL51A may be set not to pass the center position of the transfer base, even when a top-viewed outer shape of the transfer base 51aA is symmetrical.

If the top-viewed outer shape of the transfer base 51aA is asymmetrical so that a center thereof is indeterminable, a position of the label pad part 23 on a plane at the second rotation position is set to a position crossing the transfer base rotation axis CL51A under the base part 2A.

The modifications of the Embodiment 1 and Embodiment 2 may properly be combined within a possible scope.

A combination of one of the product transfer apparatuses 52 and 52A, one of the printers 62 and 62A, and the work pallet 31 may be called and handled as a product transfer system HST (refer to FIG. 1).

According to the present invention, there is provided an effect of pasting, to a plate-like product, a label at an optional position in an optional orientation without causing problems in a pasting quality.

(United States Designation)

In connection with United States designation, this international patent application claims the benefit of priority under U.S.C. 119(a) to Japanese Patent Application No. 2017-215467 filed on Nov. 8, 2017 and Japanese Patent Application No. 2018-204607 filed on Oct. 31, 2018 and contents disclosed therein are incorporated herein by reference.

The invention claimed is:

1. A product transfer apparatus, comprising:
a product suction pad part having a suction cup part capable of sucking a generally planar product;
a transfer base provided by the product suction pad part; and
a label suction part installed on the transfer base and having a label pad, which is able to suck a label to be pasted on the product, and the label suction part is configured to move the label pad up and down between a position higher than a position of a front end of the suction cup part and a position lower than the position of the front end of the suction cup part,
a rotation part configured to rotate the label suction part around a label suction rotation axis extending in an up-down direction, wherein
the label suction part has an arm extending in a diametral direction from the label suction rotation axis and having the label pad at a front end thereof, wherein the arm is turned by operation of the rotation part between a first rotation position outside an external shape of the transfer base and a second rotation position inside the external shape of the transfer base.

2. The product transfer apparatus as set forth in claim 1, further comprising, at the second rotation position, the label pad is under a center position of the transfer base.

3. The product transfer apparatus as set forth in claim 1, comprising:
an up-down drive part configured to move the transfer base up and down;
a rotation drive part configured to rotate the transfer base around a transfer base rotation axis extending in the up-down direction; and
a horizontal drive part configured to horizontally move the transfer base, wherein:
the transfer base is arranged at a position intersecting the transfer base rotation axis; and
at the second rotation position, the label pad is positioned to intersect the transfer base rotation axis.

4. A product transfer apparatus, comprising:
a product suction pad part having a suction cup part capable of sucking a generally planar product;
a transfer base provided by the product suction pad part; and
a label suction part attached to installed on the transfer base and having a label pad, which is able to suck a label to be pasted on the product, and the label suction part is configured to move the label pad up and down between a position higher than a position of a front end of the suction cup part and a position lower than the position of the front end of the suction cup part.

5. The product transfer apparatus as set forth in claim 4, further comprising the label pad having a flat bottom face that provides a suction face to suck the label.

6. The product transfer apparatus as set forth in claim 4, further comprising the apparatus being provided with a rotation part to rotate the label suction part around a label suction rotation axis extending in an up-down direction.

7. The product transfer apparatus as set forth in claim 1, the apparatus further comprising:
an up-down drive part configured to move the transfer base up and down;
a rotation drive part configured to rotate the transfer base around a transfer base rotation axis extending in the up-down direction; and
a horizontal drive part configured to horizontally move the transfer base.

8. The product transfer apparatus as set forth in claim 7, wherein the transfer base comprises:
a base part arranged at a position intersecting the transfer base rotation axis; and
an auxiliary part of the transfer base having the label suction part and supported by the base part in such a way as to be movable away from and close to the transfer base rotation axis.

9. A product transfer system, comprising:
a work pallet that supports a generally planar product;
a printer that discharges a label printed with information of the product; and
a product transfer apparatus that has a product suction pad part having a suction cup part capable of sucking the product, a transfer base provided by the product suction pad part, and a label suction part installed on the transfer base and having a label pad to suck the label discharged from the printer, and the label suction part is configured to move the label pad up and down between a position higher than a position of a front end of the suction cup part and a position lower than the position of the front end of the suction cup part, wherein:
the label has, on a bottom face, a non-adhesive part along each of a pair of width-direction edge parts; and
the printer has a support tool to support the pair of non-adhesive parts of the discharged label.

10. A product transfer system, comprising:

a work pallet that supports a generally planar product;

a printer that discharges a label printed with information of the product; and a product transfer apparatus that has a product suction pad part having a suction cup part capable of sucking the product, a transfer base provided by the product suction pad part, and a label suction part installed on the transfer base and having a label pad to suck the label discharged from the printer, and the label suction part is configured to move the label pad up and down between a position higher than a position of a front end of the suction cup part and a position lower than the position of the front end of the suction cup part, wherein the printer has a label receiving plate having a plurality of air holes and a non-adhesive layer on a top face formed by coating.

11. A product transfer system, comprising:

a work pallet that supports a generally planar product;

a printer that discharges a label printed with information of the product; and a product transfer apparatus that has a product suction pad part having a suction cup part capable of sucking the product, a transfer base provided by the product suction pad part, and a label suction part installed on the transfer base and having a label pad to suck the label discharged from the printer, and the label suction part is configured to move the label pad up and down between a position higher than a position of a front end of the suction cup part and a position lower than the position of the front end of the suction cup part.

* * * * *

UNITED STATES PATENT AND TRADEMARK OFFICE
CERTIFICATE OF CORRECTION

| | | |
|---|---|---|
| PATENT NO. | : 11,077,978 B2 | Page 1 of 1 |
| APPLICATION NO. | : 16/761087 | |
| DATED | : August 3, 2021 | |
| INVENTOR(S) | : J. Hirono et al. | |

It is certified that error appears in the above-identified patent and that said Letters Patent is hereby corrected as shown below:

In the Claims

Column 22, Line 16 (Claim 4) change "a label suction part attached to installed on" to -- a label suction part installed on --

Signed and Sealed this
First Day of March, 2022

Drew Hirshfeld
*Performing the Functions and Duties of the*
*Under Secretary of Commerce for Intellectual Property and*
*Director of the United States Patent and Trademark Office*